(12) United States Patent
Freund

(10) Patent No.: US 8,136,155 B2
(45) Date of Patent: Mar. 13, 2012

(54) SECURITY SYSTEM WITH METHODOLOGY FOR INTERPROCESS COMMUNICATION CONTROL

(75) Inventor: Gregor P. Freund, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 1588 days.

(21) Appl. No.: 10/605,189

(22) Filed: Sep. 12, 2003

(65) Prior Publication Data

US 2004/0199763 A1   Oct. 7, 2004

Related U.S. Application Data

(60) Provisional application No. 60/320,079, filed on Apr. 1, 2003.

(51) Int. Cl.
 *H04L 9/00* (2006.01)
(52) U.S. Cl. .............................. 726/22; 726/3
(58) Field of Classification Search .................. 726/1, 5, 726/14, 18–19, 22–27; 713/152, 167; 709/229, 709/310–313, 223–225; 707/687, 694; 719/126, 719/127; 717/131, 171–174, 176–178
 See application file for complete search history.

(56) References Cited

U.S. PATENT DOCUMENTS

| | | | |
|---|---|---|---|
| 4,914,586 A | 4/1990 | Swinehart et al. ............ 707/101 |
| 5,133,053 A * | 7/1992 | Johnson et al. ............... 709/223 |
| 5,172,227 A | 12/1992 | Tsai et al. ..................... 358/133 |
| 5,412,427 A | 5/1995 | Rabbani et al. ............... 348/394 |
| 5,475,817 A | 12/1995 | Waldo et al. .................. 709/316 |
| 5,586,260 A | 12/1996 | Hu ............................... 713/201 |
| 5,596,702 A * | 1/1997 | Stucka et al. ................. 715/746 |
| 5,623,601 A | 4/1997 | Vu ................................ 713/201 |
| 5,652,621 A | 7/1997 | Adams, Jr. et al. ........... 348/272 |
| 5,682,152 A | 10/1997 | Wang et al. ..................... 341/50 |
| 5,745,701 A | 4/1998 | Nguyen-Thai et al. ....... 709/249 |
| 5,754,227 A | 5/1998 | Fukuoka ....................... 348/232 |
| 5,764,887 A | 6/1998 | Kells et al. .................... 713/200 |
| 5,798,794 A | 8/1998 | Takahashi ..................... 348/398 |
| 5,815,574 A | 9/1998 | Fortinsky ...................... 713/153 |
| 5,818,525 A | 10/1998 | Elabd ............................ 348/268 |
| 5,828,833 A | 10/1998 | Belville et al. ............... 713/201 |
| 5,832,211 A | 11/1998 | Blakley et al. ............... 713/202 |
| 5,838,903 A | 11/1998 | Blakely et al. ............... 713/202 |
| 5,848,193 A | 12/1998 | Garcia .......................... 382/232 |
| 5,857,191 A | 1/1999 | Blackwell et al. ............. 707/10 |
| 5,864,665 A | 1/1999 | Tran ............................. 713/201 |
| 5,875,296 A | 2/1999 | Shi et al. ...................... 713/202 |
| 5,881,230 A | 3/1999 | Christensen et al. ......... 709/203 |
| 5,903,754 A * | 5/1999 | Pearson ........................ 719/310 |
| 5,907,610 A | 5/1999 | Onweller ...................... 379/242 |
| 5,913,088 A | 6/1999 | Moghadam et al. .......... 396/311 |
| 5,917,542 A | 6/1999 | Moghadam et al. .......... 348/207 |
| 5,926,105 A | 7/1999 | Wakamatsu .................. 370/401 |

(Continued)

*Primary Examiner* — Kim Vu
*Assistant Examiner* — Leynna Truvan
(74) *Attorney, Agent, or Firm* — John A. Smart; G. Mack Riddle

(57) ABSTRACT

A security system with methodology for interprocess communication control is described. In one embodiment, a method for controlling interprocess communication is provided that includes steps of: defining rules indicating which system services a given application can invoke; trapping an attempt by a particular application to invoke a particular system service; identifying the particular application that is attempting to invoke the particular system service; and based on identity of the particular application and on the rules indicating which system services a given application can invoke, blocking the attempt when the rules indicate that the particular application cannot invoke the particular system service.

41 Claims, 7 Drawing Sheets

U.S. PATENT DOCUMENTS

| | | | | |
|---|---|---|---|---|
| 5,961,582 | A * | 10/1999 | Gaines | 718/1 |
| 5,968,176 | A | 10/1999 | Nessett et al. | 713/201 |
| 5,983,350 | A | 11/1999 | Minear et al. | 713/201 |
| 5,987,611 | A | 11/1999 | Freund | 713/201 |
| 5,996,077 | A | 11/1999 | Williams | 713/201 |
| 6,002,941 | A * | 12/1999 | Ablay et al. | 455/518 |
| 6,008,847 | A | 12/1999 | Bauchspies | 348/391 |
| 6,028,807 | A | 2/2000 | Awsienko | 365/230.02 |
| 6,064,437 | A | 5/2000 | Phan et al. | 348/446 |
| 6,091,777 | A | 7/2000 | Guetz et al. | 375/240 |
| 6,098,173 | A | 8/2000 | Elgressy et al. | 713/201 |
| 6,125,201 | A | 9/2000 | Zador | 382/166 |
| 6,134,327 | A | 10/2000 | Van Oorschot | 380/30 |
| 6,141,686 | A * | 10/2000 | Jackowski et al. | 709/224 |
| 6,154,493 | A | 11/2000 | Acharya et al. | 375/240.19 |
| 6,158,010 | A | 12/2000 | Moriconi et al. | 713/201 |
| 6,167,438 | A | 12/2000 | Yates et al. | 709/216 |
| 6,212,558 | B1 | 4/2001 | Antur et al. | 709/221 |
| 6,243,420 | B1 | 6/2001 | Michell et al. | 375/240.18 |
| 6,247,062 | B1 | 6/2001 | Sarkar | 709/245 |
| 6,249,820 | B1 | 6/2001 | Dobbins et al. | 709/238 |
| 6,269,099 | B1 | 7/2001 | Borella et al. | 370/389 |
| 6,304,973 | B1 | 10/2001 | Williams | 713/201 |
| 6,308,275 | B1 * | 10/2001 | Vaswani et al. | 726/2 |
| 6,317,868 | B1 * | 11/2001 | Grimm et al. | 717/127 |
| 6,321,334 | B1 | 11/2001 | Jerger et al. | 713/200 |
| 6,321,337 | B1 * | 11/2001 | Reshef et al. | 726/14 |
| 6,330,562 | B1 | 12/2001 | Boden et al. | 707/10 |
| 6,332,195 | B1 * | 12/2001 | Green et al. | 726/14 |
| 6,345,361 | B1 | 2/2002 | Jerger et al. | 713/200 |
| 6,351,816 | B1 | 2/2002 | Mueller et al. | 713/201 |
| 6,356,929 | B1 | 3/2002 | Gall et al. | 709/201 |
| 6,363,421 | B2 * | 3/2002 | Barker et al. | 709/223 |
| 6,385,724 | B1 * | 5/2002 | Beckman et al. | 713/167 |
| 6,393,474 | B1 | 5/2002 | Eichert et al. | 709/223 |
| 6,393,484 | B1 | 5/2002 | Massarani | 709/227 |
| 6,438,612 | B1 | 8/2002 | Ylonen et al. | 709/249 |
| 6,449,723 | B1 | 9/2002 | Elgressy et al. | 713/201 |
| 6,453,419 | B1 | 9/2002 | Flint et al. | 713/201 |
| 6,466,932 | B1 | 10/2002 | Dennis et al. | 707/3 |
| 6,473,748 | B1 * | 10/2002 | Archer | 706/45 |
| 6,473,800 | B1 | 10/2002 | Jerger et al. | 709/226 |
| 6,480,962 | B1 | 11/2002 | Touboul | 713/200 |
| 6,484,261 | B1 | 11/2002 | Wiegel | 713/201 |
| 6,490,679 | B1 | 12/2002 | Tumblin et al. | 713/155 |
| 6,499,110 | B1 | 12/2002 | Moses et al. | 713/201 |
| 6,510,513 | B1 | 1/2003 | Danieli | 713/156 |
| 6,526,513 | B1 | 2/2003 | Shrader et al. | 713/200 |
| 6,539,483 | B1 | 3/2003 | Harrison et al. | 713/201 |
| 6,553,498 | B1 | 4/2003 | Elgressy et al. | 713/201 |
| 6,574,736 | B1 * | 6/2003 | Andrews | 726/21 |
| 6,598,057 | B1 | 7/2003 | Synnestvedt et al. | 370/352 |
| 6,606,708 | B1 | 8/2003 | Devine et al. | 713/201 |
| 6,606,711 | B2 * | 8/2003 | Andrews et al. | 726/7 |
| 6,643,776 | B1 | 11/2003 | Boden et al. | 709/224 |
| 6,735,702 | B1 * | 5/2004 | Yavatkar et al. | 726/13 |
| 6,804,711 | B1 * | 10/2004 | Dugan et al. | 709/223 |
| 6,876,889 | B1 * | 4/2005 | Lortz et al. | 700/30 |
| 6,922,705 | B1 * | 7/2005 | Northrup | 707/200 |
| 6,980,515 | B1 * | 12/2005 | Schunk et al. | 370/230.1 |
| 7,031,314 | B2 * | 4/2006 | Craig et al. | 370/392 |
| 7,080,143 | B2 * | 7/2006 | Hunt et al. | 709/224 |
| 7,082,133 | B1 * | 7/2006 | Lor et al. | 370/392 |
| 7,092,943 | B2 * | 8/2006 | Roese et al. | 707/9 |
| 7,191,469 | B2 * | 3/2007 | Erlingsson | 726/27 |
| 7,209,961 | B2 * | 4/2007 | Bantz et al. | 709/220 |
| 7,260,621 | B1 | 8/2007 | Lavian et al. | 709/223 |
| 7,398,389 | B2 * | 7/2008 | Teal et al. | 713/164 |
| 7,406,603 | B1 * | 7/2008 | MacKay et al. | 713/193 |
| 7,406,713 | B2 * | 7/2008 | Sheymov et al. | 726/23 |
| 7,433,465 | B2 * | 10/2008 | Casey et al. | 379/413.02 |
| 7,509,675 | B2 * | 3/2009 | Aaron | 726/22 |
| 7,761,706 | B2 * | 7/2010 | Lambert | 713/165 |
| 2003/0055962 | A1 | 3/2003 | Freund et al. | 709/225 |
| 2003/0177389 | A1 | 9/2003 | Albert et al. | 713/201 |
| 2004/0078591 | A1 | 4/2004 | Teixeira et al. | 713/201 |

* cited by examiner ered by users through Web "browsers" (e.g., Microsoft® Internet Explorer or Netscape Navigator) or other Internet applications. Browsers and other Internet applications include the ability to access a URL (Universal Resource Locator) or "Web" site. In the last several years, the Internet has become pervasive and is used not only by corporations, but also by a large number of small businesses and individual users for a wide range of purposes.

SECURITY SYSTEM WITH METHODOLOGY FOR INTERPROCESS COMMUNICATION CONTROL

CROSS REFERENCE TO RELATED APPLICATIONS

The present application is related to and claims the benefit of priority of the following commonly-owned, presently-pending provisional application(s): application Ser. No. 60/320,079, filed Apr. 1, 2003, entitled "Security System with Methodology for Interprocess Communication Control", of which the present application is a non-provisional application thereof. The present application is also related to the following commonly-owned, presently-pending application(s): application Ser. No. 10/159,820, filed May 31, 2002, entitled "System and Methodology for Security Policy Arbitration"; application Ser. No. 10/249,803, filed May 8, 2003, entitled "Security System And Methodology For Providing Indirect Access Control". The disclosures of each of the foregoing applications are hereby incorporated by reference in their entirety, including any appendices or attachments thereof, for all purposes.

COPYRIGHT STATEMENT

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Appendix Data

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Jul. 25, 2003 2:21 pm, size: 22 KB; Object ID: File No. 1; Object Contents: Source Code.

BACKGROUND OF INVENTION

1. Field of the Invention

The present invention relates generally to systems and methods for maintaining security of computer systems connected to one or more networks (Local Area Networks or Wide Area Networks) and, more particularly, to a security system with methodology for interprocess communication control.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or LANs. In both cases, maintaining security and controlling what information a computer user could access was relatively simple because the overall computing environment was limited and clearly defined.

With the ever-increasing popularity of the Internet, however, more and more computers are connected to larger networks. Providing access to vast stores of information, the Internet is typically accessed by users through Web "browsers" (e.g., Microsoft® Internet Explorer or Netscape Navigator) or other Internet applications. Browsers and other Internet applications include the ability to access a URL (Universal Resource Locator) or "Web" site. In the last several years, the Internet has become pervasive and is used not only by corporations, but also by a large number of small businesses and individual users for a wide range of purposes.

As more and more computers are now connected to the Internet, either directly (e.g., over a dial-up or broadband connection with an Internet Service Provider or ISP) or through a gateway between a LAN and the Internet, a whole new set of challenges face LAN administrators and individual users alike: these previously closed computing environments are now open to a worldwide network of computer systems. A particular set of challenges involves attacks by perpetrators (hackers) capable of damaging the local computer systems, misusing those systems, and/or stealing proprietary data and programs.

The software industry has, in response, introduced a number of products and technologies to address and minimize these threats, including firewalls, proxy servers, and similar technologies—all designed to keep outside hackers from penetrating a computer system or corporate network. Firewalls are applications that intercept the data traffic at the gateway to a Wide Area Network (WAN) and check the data packets (i.e., Internet Protocol or "IP" packets) being exchanged for suspicious or unwanted activities.

Another security measure that has been utilized by many users is to install an end point security (or personal firewall) product on a computer system to control traffic into and out of the system. An end point security product can regulate all traffic into and out of a particular computer. For example, an end point security product may permit specific "trusted" applications to access the Internet while denying access to other applications on a user's computer. To a large extent, restricting access to "trusted" applications is an effective security method. However, there are cases in which an untrusted or malicious application may cause the trusted application to perform unauthorized actions on its behalf, thereby circumventing current security mechanisms.

In present-day operating systems, such as Microsoft® Windows for example, a lot of interaction occurs between different processes (e.g., applications, drivers, and the like) which are running on a computer system at the same time. Moreover, considerable interaction occurs between different applications and so-called "services." A service may be thought of as a special case application that exists to serve other applications (e.g., by providing special functionality or performing particular tasks). For example, a DNS service is provided by a special application that performs DNS lookup services on behalf of other applications.

Notwithstanding the fact that a given computer system may be protected by a firewall or an end point security product, these services pose an additional security risk. Stated more generally, interprocess communication provides additional opportunities for breaching security measures employed to protect computer systems. For example, a rogue application can circumvent conventional security measures by using services or interprocess communication to cause another application to perform actions on its behalf. The rogue application uses services or interprocess communication as a proxy to obtain, in effect, an elevation of its security privileges. This elevation of its security privileges enables it to breach security by causing another application or service to perform actions that the rogue application is not able to do itself (according to operating system privilege settings). In addition, the rogue application is able to disguise the fact that it is accessing the Internet by going through another application or service (e.g., an operating system service) in a manner that is not detected by a conventional firewall.

For example, Windows XP includes a DNS (domain name system) service that performs DNS lookup on behalf of other applications. DNS is itself normally a harmless protocol that contacts a DNS server for translating domain names (e.g., cnn.com) into IP addresses. However, a malicious application has the ability to use Windows' built-in DNS service to communicate with a malicious DNS server. For example, the malicious application may use the DNS service for a DNS lookup of "MySecret.Hacker.com". The DNS server at the hacker site ("Hacker.com") would then get a query from the local DNS server asking whether it has an IP address for "MySecret". In fact, what the hacker site DNS server receives is a token (string of "MySecret"). At this point, the malicious application may engage in almost unlimited communication with the malicious DNS server using an awkward, but also very effective, protocol.

This example of a malicious application using the DNS service to communicate with a malicious DNS server is illustrated in the diagram shown in FIG. 1A. As shown, on client machine 10, malicious application ("malware") 13 communicates with a local DNS service 15 to perform a DNS look-up of "MySecret.Hacker.com" (where, in this example, "Hacker.com" is a malicious DNS server at a remote site). In response to this request, the local DNS service 15 sends a request over the Internet to the malicious DNS server 18 asking whether the Hacker.com DNS server has an IP address for "MySecret". Upon receipt of this request, the malicious DNS server 18 has the token containing confidential information, "MySecret", from the client machine 10. A conventional client-side firewall (e.g., application-oriented firewall software 11) would not block this transmission of confidential information as it only looks to see whether the malware application 13 was communicating (directly) with the Internet. Since the foregoing security breach does not involve direct communication between a potentially malicious application and the Internet, a conventional firewall would not detect the security breach. In other words, since the malicious application was able to masquerade its Internet access by going through an operating system service, the malicious application was able to breach security in a manner that would not be detected by a conventional firewall.

The malicious application may also use some of the same approaches to attack a computer's underlying security application itself. For instance, the malicious application may use interprocess communications with another application to attack the security application, or the malicious application may attack the security application directly by posting user input messages (e.g., keystrokes, mouse input, or the like) to the security application. If the malicious application can disable the security application, it can gain unfettered access to the entire computer system.

Referring again to FIG. 1A, the client machine 10 includes application-oriented firewall (end point security) software 11, which serves to monitor potentially malicious applications (e.g., malware 13) for unauthorized Internet access. For environments which allow one application to send messages to another application (e.g., Microsoft Windows environments), malware 13 may send messages to firewall software 11 in an attempt to disable the firewall. As illustrated by an interprocess communication path 17, malware 13 may send keystroke and/or mouse input messages (e.g., using a Microsoft Windows "SendMessage" API call) that masquerade as user input. For example, when malware 13 attempts to access the Internet, assume that the firewall software 11 displays a dialog box to the user inquiring whether malware 13 should be allowed to access the Internet. At this point, malware 13 could masquerade as the user by sending forged user input (e.g., keystroke and/or mouse input messages) to the firewall software 11, via the interprocess communication path 17, thereby effectively overcoming the security provided by firewall software 11. This is an instance of a malicious application using interprocess communications to either abuse/misuse a service or shut down or interfere with a service that is critical for security.

One current approach for preventing unauthorized communications is to attempt to obfuscate or "hide" application interfaces from other (potentially malicious) applications. For example, random names can be assigned to windows, the appearance of items and title prompts can be changed, and so forth so that these interfaces are more difficult for a malicious application to locate and misuse. However, this approach is only of limited utility and does not fully solve the problem.

Current systems also provide facilities for users to establish access privileges. However, this solution is difficult to implement as considerable expertise is required and the facilities provided by certain operating systems are subject to well-known weaknesses and vulnerabilities. It is very difficult to configure access privileges in a manner which provides security but at the same time does not interfere with the users' ability to perform normal business and/or personal activities. In addition, not all operating systems provide support for establishing access privileges. For example, personal editions of certain operating systems do not include this type of access permission setting feature. In fact, a considerable number of current operating systems (e.g., personal edition operating system versions) broadly permit applications to communicate with each other with few limitations. For these reasons, the permission setting features of current systems do not provide adequate protection against misuse of interprocess communications.

A security solution is required that controls communication channels among processes (including applications, services, and the like) to provide improved security. The solution should not only address the problem of a malicious application misusing another application or service, but should also provide a solution to the more general problem of using interprocess communications to breach security. The present invention provides a solution for these and other needs.

SUMMARY OF INVENTION

A security system with methodology for interprocess communication control is described. In one embodiment, a method for controlling interprocess communication is provided that includes steps of: defining rules indicating which system services a given application can invoke; trapping an attempt by a particular application to invoke a particular system service; identifying the particular application that is attempting to invoke the particular system service; and based on identity of the particular application and on the rules indicating which system services a given application can invoke, blocking the attempt when the rules indicate that the particular application cannot invoke the particular system service.

In another embodiment a method for regulating communications between processes in a computer system comprises: defining a policy specifying whether one process may communicate with another process; intercepting an attempt by a first process to communicate with a second process; identifying the first process that is attempting to communicate with the second process; identifying the second process; based on said policy, determining whether the first process may communicate with the second process; and allowing the first process to communicate with the second process if said policy indicates that the first process may communicate with the second process.

In another embodiment, a method for controlling interprocess communications from one application to another comprises: registering a first application to be protected from other applications; detecting an attempt to access the first application using interprocess communication; identifying a second application that is attempting to access the first application using interprocess communication; and rerouting the attempt to access the first application through an interprocess communication controller that determines whether to allow the attempt, based on rules indicating whether the second application may access the first application using interprocess communication.

In another embodiment, a system for regulating interprocess communication between applications is described. The system comprises a policy specifying applications that are permitted to communicate with a first application using interprocess communication; a module for detecting a second application attempting to communicate with the first application using interprocess communication; and an interprocess communication controller for identifying the second application attempting to communicate with the first application and determining whether to permit the communication based upon the identification of the second application and the policy specifying applications permitted to communicate with the first application.

DETAILED DESCRIPTION

Glossary

Figure 1A:
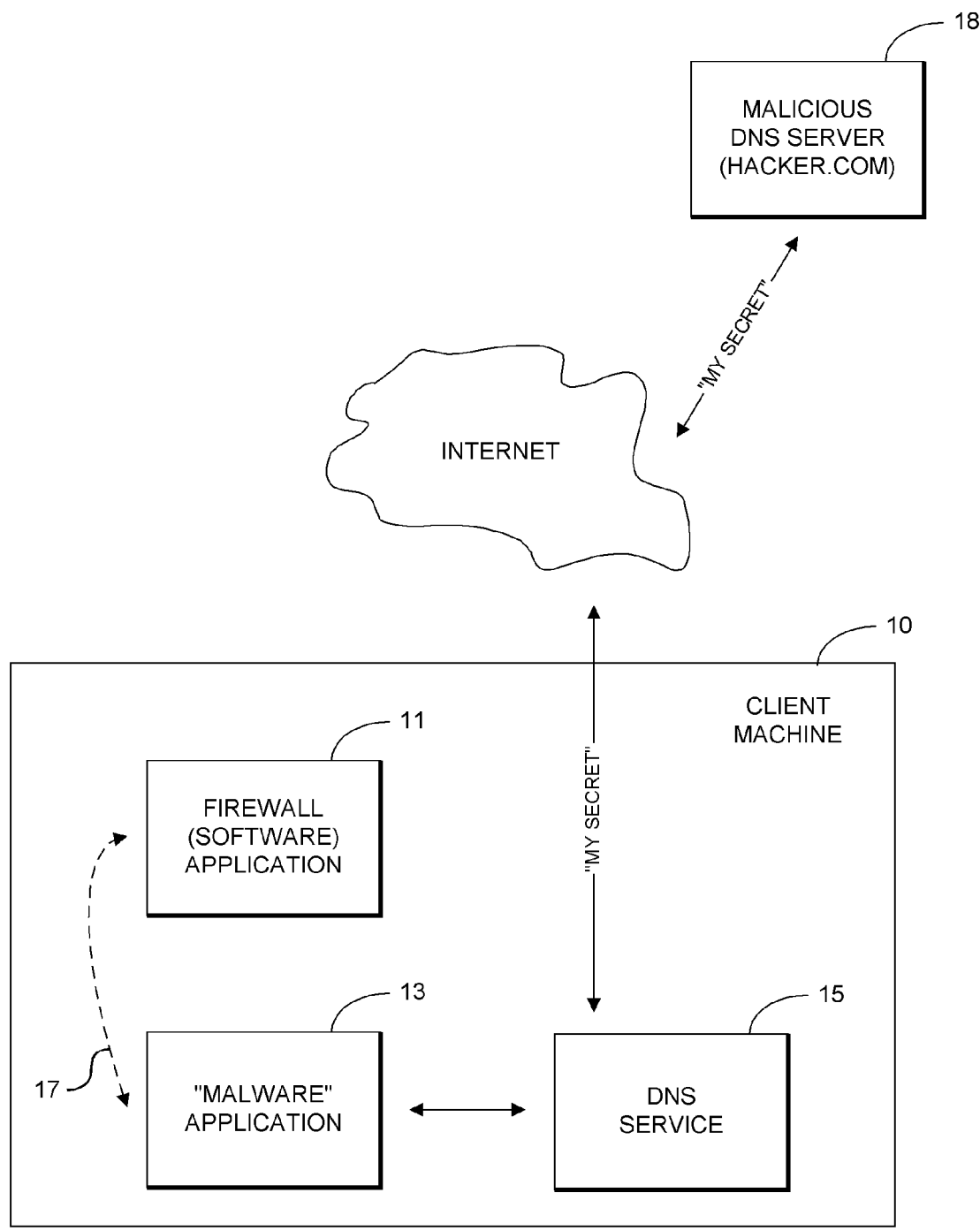
FIG. 1A is a block diagram illustrating an example of a malicious application using a DNS service to communicate with a malicious DNS server.

The following definitions are offered for purposes of illustration, not limitation, in order to assist with understanding the discussion that follows.

DNS: The domain name system (DNS) is the way that Internet domain names are located and translated into Internet Protocol addresses. A domain name is a meaningful and easy-to-remember "handle" for an Internet address.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a local area network (LAN) or a larger wide area network (WAN) such as the Internet in order to provide security to the machine. For further information regarding an end point security solution for controlling the interaction of a machine with other connected machines and devices, see e.g., commonly-owned U.S. Pat. No. 5,987,611, entitled "System and Methodology for Managing Internet Access on a per Application Basis for Client Computers Connected to the Internet", the disclosure of which is hereby incorporated by reference.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

LPC: LPC refers to Local Procedure Call (LPC), a facility of the Windows NT/2000/XP operating system which is designed for subsystem communication. LPC is comparable to the Remote Procedure Call (RPC) used in UNIX environments for communication between processes running on two different machines; however, LPC has been optimized for communication between processes running on the same machine. The LPC facility is used as a communication mechanism between system services (or subsystems) and their client processes. A client thread invokes LPC when it needs some service from the subsystem. The LPC mechanism passes on the parameters for the service invocation to the server thread. The server thread executes the service and passes the results back to the client thread using the LPC facility. For further information regarding LPC, see e.g., Dabak, Prasad et al, "Undocumented Win NT", October 1989, M&T Books, the disclosure of which is hereby incorporated by reference. An on-line copy of this book is currently available via the Internet at www.windowsitlibrary.com.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Process: A process or task refers to the combination of a program (e.g., an application program) being executed on an operating system and associated bookkeeping information used by the operating system. When a program is executed, the operating system typically creates a new process for each instance of the program being executed. The process is like an envelope for the program which identifies the program with a process number (e.g., a process identifier or "ID") and associates other bookkeeping information to the process. Many operating systems, including UNIX and Windows, are capable of running many processes (or tasks) at the same time and are called multi-tasking operating systems.

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Further information on security policies is available in "RFC 2196: Site Security Handbook, (September 1997)," the disclosure of which is hereby incorporated by reference. In this document, "security policy" or "policy" refers to a set of security policies and rules employed by an individual or by a corporation, government entity, or any other organization operating a network or other computing resources.

Service: A service is a special type of application that serves other applications by providing special functionality or performing particular tasks on behalf of the other application. Most modern operating systems typically include subsystems which make available a number of different services to applications which are running on the operating system. In the Microsoft Windows environment, for example, the operating system provides a LPC (local procedure call) facility which enables efficient communication with subsystems providing services. An example of a service is a DNS service provided by a subsystem of the Windows operating system subsystem that performs DNS lookup services on behalf of another application. For further information regarding services, see e.g., Dabak, Prasad et al, "Undocumented Win NT", October 1989, M&T Books, the disclosure of which is hereby incorporated by reference. An on-line copy of this book is currently available via the Internet at www.windowsitlibrary.com.

Winsock: Winsock refers to the Microsoft Windows Sockets 2 interface, which enables programmers to create network-capable applications to transmit application data across a network independent of the network protocol being used. Winsock defines a standard service provider interface (SPI) between the application programming interface (API), with its exported functions and the protocol stacks. It uses the sockets paradigm that was first popularized by Berkeley Software Distribution (BSD) UNIX. For further information regarding Winsock, see e.g., "Windows Sockets API Reference", available from Microsoft Corporation, the disclosure of which is hereby incorporated by reference. A copy of this documentation is currently available via the Internet at msdn.microsoft.com/library.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like.

Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

Figure 1B:
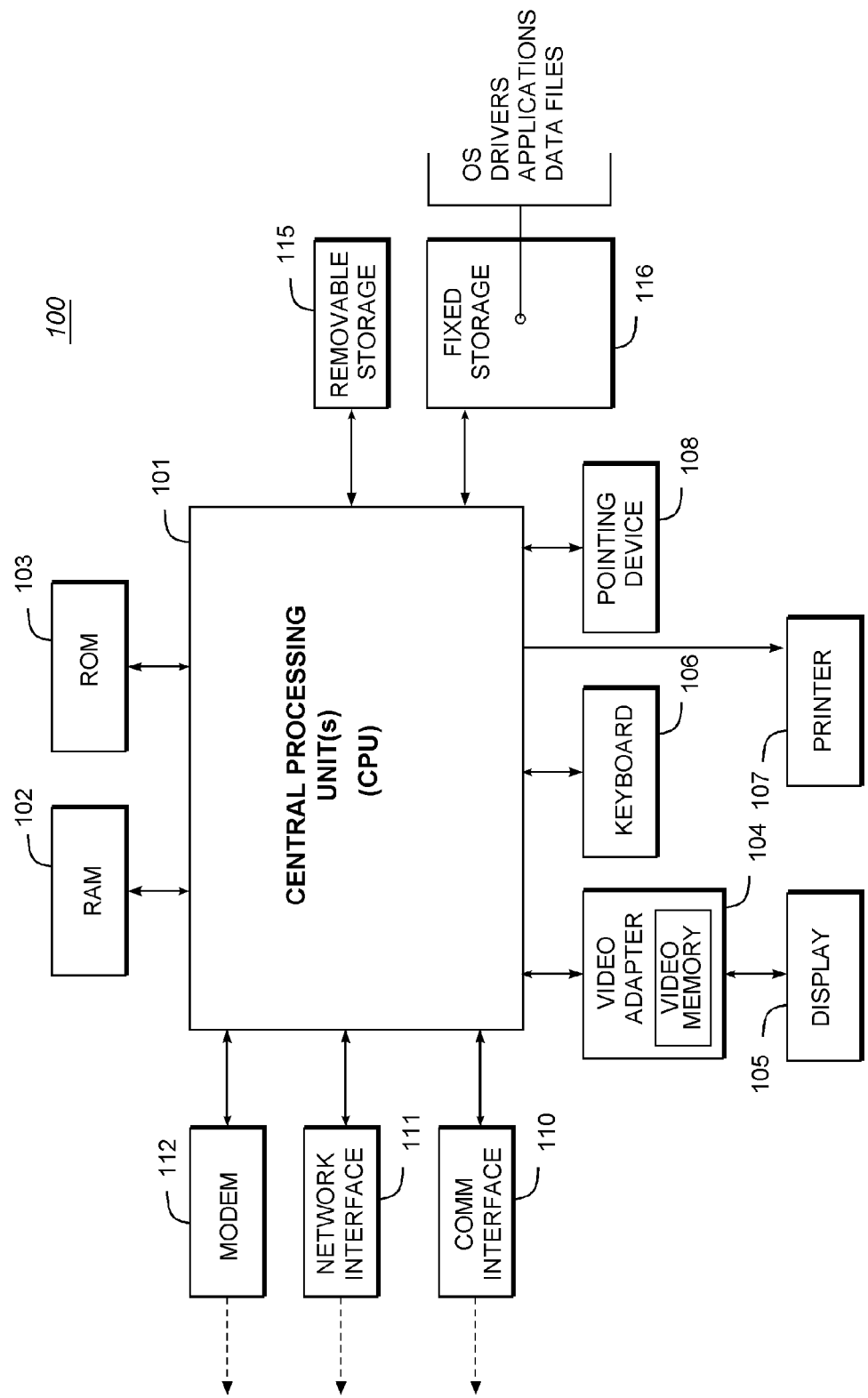
FIG. 1B is a very general block diagram of an IBM-compatible computer system which may be used for implementing the present invention.

The present invention may be implemented on a conventional or general-purpose computer system, such as an IBM-compatible personal computer (PC) or server computer. FIG. 1B is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1B, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
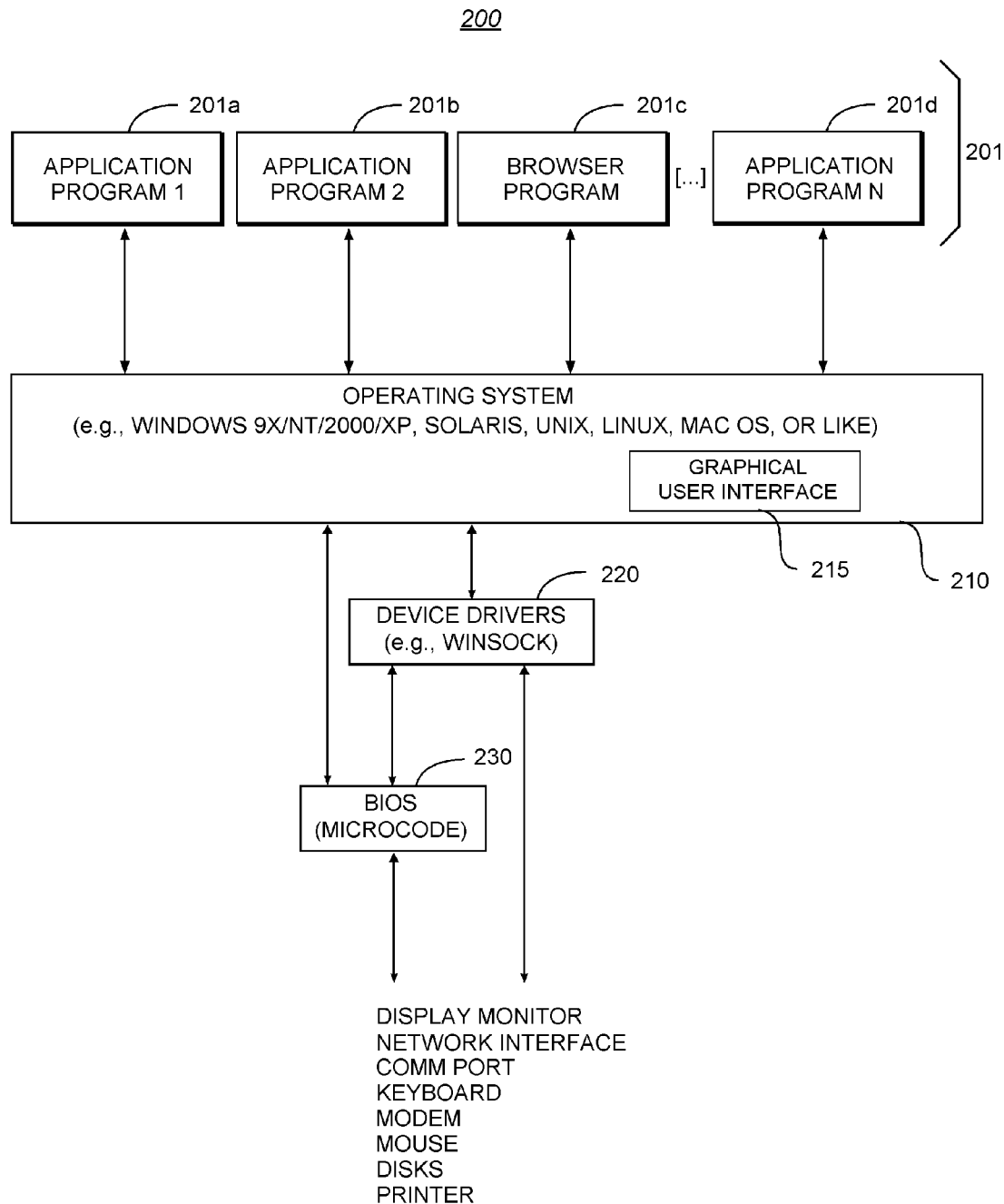
FIG. 2 is a block diagram of a software system for controlling the operation of the computer system of FIG. 1B.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples of interprocess communications in a Windows operating system environment. The present invention, however, is not limited to any particular environment or device configuration. In particular, a Windows operating system environment is not necessary to the invention, but is used to provide a framework for discussion. Instead, the present invention may be implemented in any type of system architecture or processing environment capable of supporting the methodologies of the present invention presented in detail below.

Overview

In accordance with the present invention, a security system is provided that controls communication channels between and among applications and services. Here, a "service" may be considered as a special type of application that provides particular functionality or performs specific tasks on behalf of another application. In the Microsoft Windows environment, for example, the operating system provides a LPC (local procedure call) facility that underlies a lot of higher-level operating system services. The LPC facility enables efficient communication with subsystems of the operating system which provide various operating system services. As another example from the Microsoft Windows environment, processes may communicate using DDE (dynamic data exchange), which itself relies on Windows messaging. By controlling the various different communication channels amongst applications and services, the present invention is able to provide improved security.

Normally in an operating system, the various applications and services "live" (reside) in separate memory spaces. In order for one application to communicate with another application or service, the operating system must provide some sort of communication channel between the two applications or services. In UNIX operating environments, for example, the operating system provides "named pipes". In Microsoft Windows environments, the operating system provides "ports" which are similar to named pipes. Microsoft Windows also provides a simpler communication channel using Windows messaging, which allows one application to send a message to a specific window or thread of another application.

In order to control direct and indirect access by an application to a network (e.g., the Internet), cases involving both direct and indirect access need to be addressed. In order to control instances of direct access by an application, it is relatively straightforward to match activity/traffic against an established security policy. When exceptions to the policy occur either the user may be asked for permission (e.g., via presentation of a dialog box in the user interface) or default handling may be applied (e.g., deny access). In instances of indirect access, however, a different approach must be applied. In order to control indirect access, the security system of the present invention intercepts the operating system call(s) that allows an application (e.g., a potentially malicious application) to subscribe to or otherwise access one of the communication channels (e.g., a "port" providing access to a particular operating system service). A policy is then applied against the application attempting to access a service (in a manner similar to that done for direct access attempts) based upon the service that the application is attempting to access. For example, the security system of the present invention treats, for purposes of security, the activity of talking to the DNS service the same as attempting to directly access the Internet.

In particular, to control indirect access certain communications (e.g., "open port" local procedure calls in Windows environments) are intercepted at the level of the operating system kernel. At that point, the system of the present invention can determine what address or port a given application is attempting to talk to, based on a text string passed during invocation of the communication (e.g., "open port") call. Based on the determined address or port, the system of the present invention can uncover an attempt to access the Internet. Thus, in a situation in which a given application is attempting to access a local DNS service, the system may treat the attempt to access this service as the equivalent of a direct DNS lookup and apply the appropriate security policy accordingly.

A first aspect of the present invention provides the ability to control access to well-known services by potentially malicious applications. Malicious applications may seek to exploit well-known services that exist on a system, such as those that are published by services components or by the operating system. In operation, a service component, such as an RPC-based DNS resolver, may create a "subscription" address or "port" that a potentially malicious application may use to talk to the service. The created subscription address or port serves as a mechanism that allows a potentially malicious application to indirectly communicate with other applications and resources (e.g., with a malicious server) using specifically formatted messages. Therefore, in accordance with the present invention, an application's ability to engage in such communication is regulated for the purpose of enforcing security policies.

Control is achieved by filtering an application's request to access a service through security policy management mechanisms of the present invention in order to determine whether or not the application should be allowed to access the service. This approach is adopted since one of the end results of the application's access to the service is the application obtaining access to particular resources or networks (e.g., the Internet). In particular, the approach controls the ability of an untrusted application to access the Internet via indirect means, such as through a trusted application (which is operating in response to the untrusted application).

As another aspect of the present invention, policy information describing different protection levels for applications is registered with the operating system (kernel). This approach is used to control the ability of one application to send messages (e.g., user input-based messages, such as keystrokes, mouse input, or the like) to another application. For example, client-side firewall management software (e.g., a ZoneAlarm® product or process) can be registered with the operating system and assigned a protection level that prevents other applications from sending or posting certain types of messages (e.g., keyboard messages and mouse input messages) to the firewall (security) software.

Different mechanisms may be applied to protect an application from communications sent by other applications. For instance, an application may be registered with the system and specific rules provided that must be followed to communicate with the application. Alternatively, an application may be unregistered in which case it must ask for permission in order to engage in certain activities. The system responds based on policy rules for an untrusted (unregistered) application.

System Components

Figure 3:
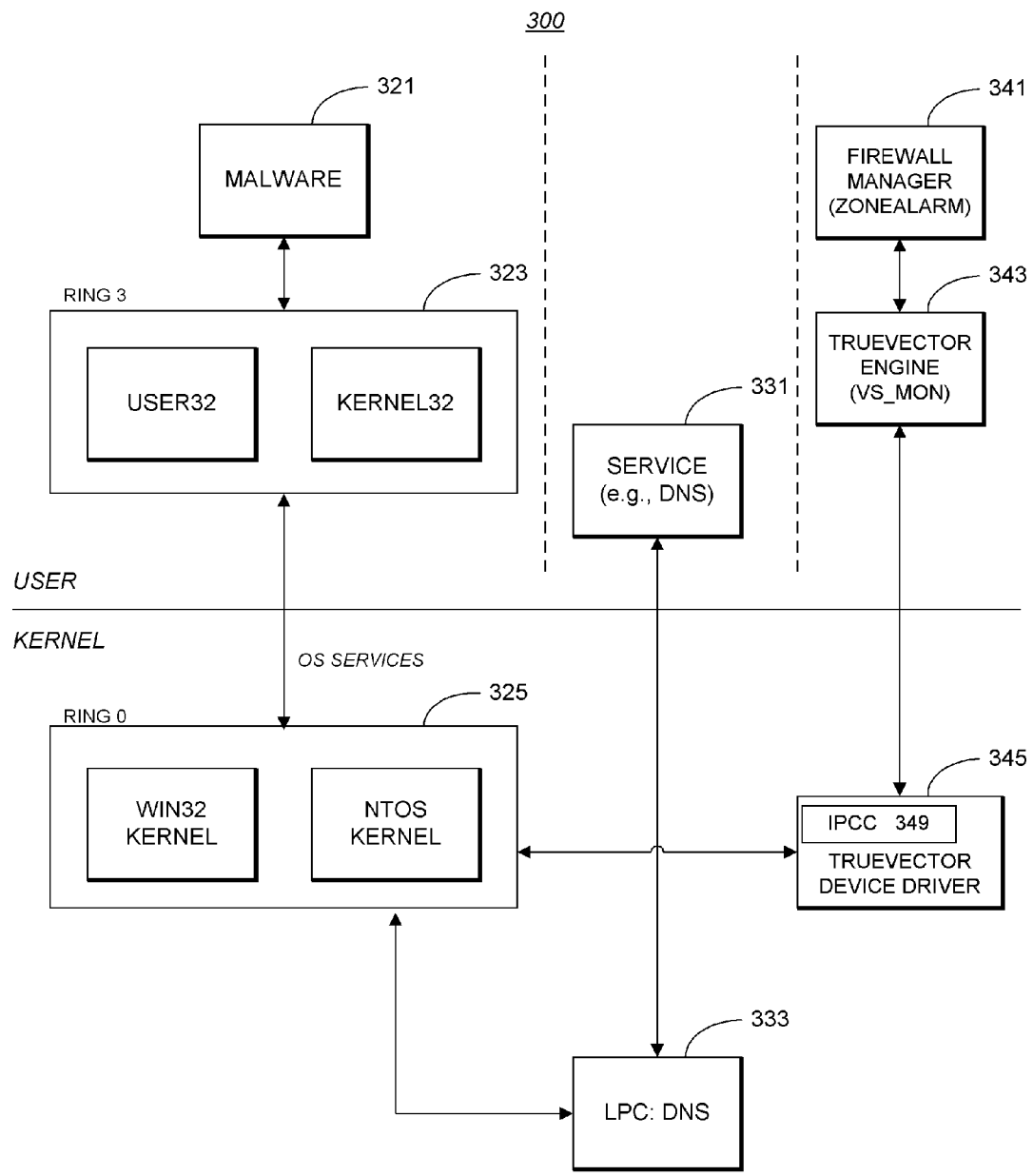
FIG. 3 is a high-level block diagram illustrating an environment in which the present invention may be embodied.

FIG. 3 is a high-level block diagram illustrating an environment 300 in which the present invention may be embodied. "Malware" 321 represents an unknown application that is potentially malicious. This unknown malware application 321 will use various aspects of the operating system. In the Microsoft Windows environment, for example, the malware application would interface with "kernel32" and "user32" components (shown at 323), which are operating system components that provide application programming interfaces (APIs) to applications. As shown in FIG. 3, the kernel components 323 exist at the user (privilege) level (ring 3). These components communicate with corresponding lower-level (i.e., more privileged) operating system components, Win32 kernel and NTOS kernel components 325, that exist at the kernel or root (privilege) level (ring 0). The NTOS kernel component provides basic, low-level operating services, such as file system management. The Win32 kernel component supports other low-level subsystems, such as the graphics subsystem (e.g., Windows GDI subsystem).

The built-in security (i.e., privilege level enforcement) provided by the operating system prevents a process from crossing over from the "user" privilege level (ring 3) to the "kernel" privilege level (ring 0) unless proper authorization is obtained. To cross this line, a process must either be part of the operating system itself or be a process accorded kernel-level privileges, such as a low-level device driver (e.g., either digitally signed by an authorized entity, or approved by an administrator with root privileges). In the configuration shown in FIG. 3, malware 321 is attempting to access a service, such as DNS (or other) service 331, which exists at the user (privilege) level. Access is ordinarily achieved by invoking the corresponding kernel-level local procedure call (LPC), for example, a LPC DNS 333.

In accordance with the present invention, security service components with interprocess controlling capability are provided, including a kernel component and two user-level components. The user-level components include a TrueVector® engine (VS_MON) 343 and a firewall manager (ZoneAlarm®) 341. The TrueVector engine 343 provides policy enforcement of the firewall. The firewall manager 341 provides user interaction (e.g., user interface) for the TrueVector engine 343. The kernel component comprises the TrueVector device driver (VS_DATA_NT) 345 which includes the core firewall functionality. Of particular interest to the present invention is the addition of an Interprocess Communication Controller (IPCC) subcomponent 349 to the TrueVector device driver 345, which is described in further detail below.

In ordinary operation, a service would publish a port by invoking a corresponding operating system API call for opening a port (e.g., a "NtCreatePort" API call in a Windows environment). The port, which is an abstraction of a communication channel, is associated with a text string that identifies that specific port. The operating system kernel component 325 maintains a list of open ports. During its attempt to gain unauthorized Internet access, malware 321 attempts to create a communication channel (e.g., port) to the DNS service 331 and then connect to that port. More specifically, malware 321 invokes the Windows Winsock (Windows socket) API (residing in user-level components 323 at ring 3) which in turn invokes the lower-level kernel components 325, specifically invoking the NTOS component operating at ring 0. The incoming connection request of malware 321 that attempts to create a communication channel can be trapped and re-directed. The connection request attempt also includes sufficient information (e.g., text string) to allow one to determine the type of service that is being requested. Invocation of the DNS local procedure call 333 leads to invocation of the user-level DNS service 331. Once the communication port is opened, malware 321 may send messages to a DNS server, including sending confidential information to a malicious DNS server.

By monitoring connection requests (e.g., "hooking" the "NtCreatePort" API call), the present invention can monitor an application's attempt to access a specific service. Typically, the vast majority of connection requests will be valid and can simply be passed through for processing. Requests can be intercepted and redirected to the TrueVector engine 343 which in turn may determine whether the application that originated the request for Internet access has appropriate privileges (based on the system's specified rules and policy, and/or user interaction). If the application in question has appropriate privileges, its request is granted and access to the service is permitted. Otherwise, the request is denied, with access to the service being blocked. In the latter case, the application is blocked from even establishing a communication channel.

Another case in which a malicious application (e.g., malware 321) may attempt to circumvent security measures is to send messages (or other communications) to another application (or process). For example, the client-side firewall manager 341 provides a user interface for receiving user input, including providing notification to the user of an attempt to access the Internet and receiving user input as to whether or not a particular application should be permitted to access the Internet. To hide the fact that the malware application is attempting to access the Internet, the malware application 321 may attempt to shut down or disable the firewall manager 341 in one of several ways. The malware application may, for example, wait until a shared window which is provided across the desktop pops up and use this shared window to post user input-based messages, such as keystrokes and mouse input, to the firewall manager 341. These user input messages may seek to block the firewall manager 341 from notifying the user of the access attempt or, alternatively, may indicate to the firewall manager that access by the malware application should be approved.

To prevent other applications from sending or posting certain types of messages (e.g., keyboard messages and mouse input messages), the user level components of the security system (i.e., firewall manager 341 and TrueVector engine 343) are registered with the Interprocess Communication Controller (IPCC) subcomponent 349 of the device driver 345. These user level components of the security system are registered as a protected application and are assigned a protection level that prevents other applications from sending or posting certain types of messages using these user level components. The types of messages that the application wants to be protected against (i.e., messages to be blocked) are also specified during this registration process.

As a result of the registration of the firewall manager 341, when an application (e.g., malware application 321) uses the user32 API component 323 to send a message to the firewall manager 341 that says "quit", or attempts to give specific user interface commands (e.g., a "WM_COMMAND" in a Windows environment), the IPCC 349 intercepts the message and examines it to determine whether or not the message is permitted. Typically, the IPCC 349 will first look at the source and the destination of the message. If the source and the destination are the same application or process, then the message is allowed to proceed to the destination. However, if the target is a protected application or process (e.g., the firewall manager 341), the IPCC 349 determines whether the message is the type of message that should be blocked. In the currently preferred embodiment, messages sent to a registered application will be blocked (rejected) if they are of the type that the registered application is to be protected against. The IPCC 349 may include the full decision-making capabilities to make this determination and/or the IPCC may consult a rules engine for determining whether or not particular types of messages should be blocked. For example, the IPCC 349 may block certain communications which are prohibited regardless of the circumstances, but may invoke an external rules engine (e.g., a rules engine component of TrueVector engine 343) if more complex policy arbitration and decision making is required. Those skilled in the art will appreciate that there are a number of other variations that may be used for determining whether or not to block particular messages. For example, communication privileges may be provided only to certain known, approved applications or processes, with other communications being blocked. The operations of the IPCC and other components of the security system of the present invention in controlling interprocess communications will now be described in greater detail.

Methods of Operation

Figure 4:
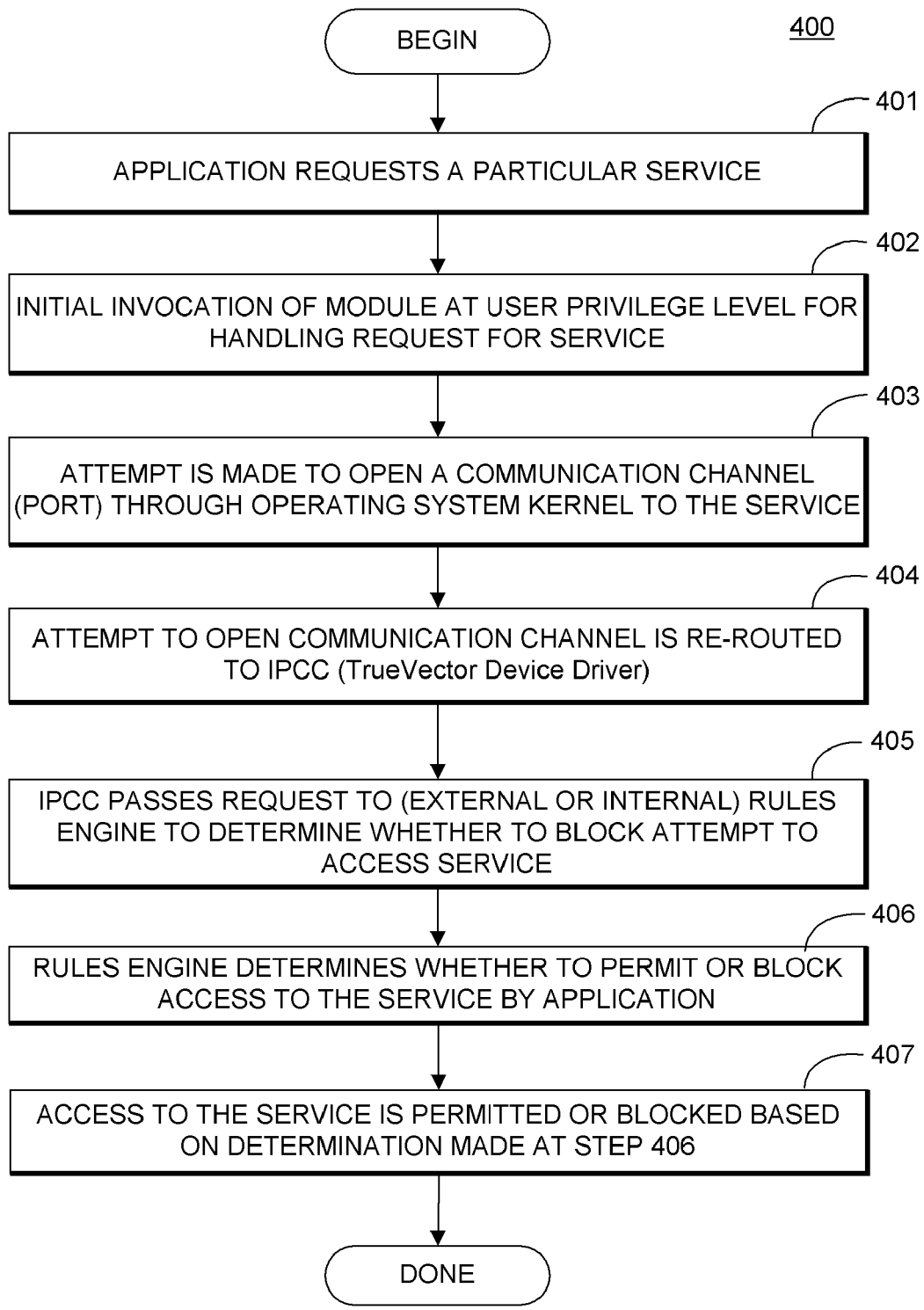
FIG. 4 presents a flowchart illustrating the high-level methods of operation of the system of the present invention in controlling indirect access to networks and resources by a potentially malicious application.

FIG. 4 comprises a flowchart 400 illustrating the high-level methods of operation of the system of the present invention in controlling indirect access to networks or resources by a potentially malicious application. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for down-loading and installation from an Internet location (e.g., Web server). The following discussion uses the operations of the system of the present invention in a Microsoft Windows operating environment as an example, however a similar approach may also be used in other operating environments.

As described above, a particular service (e.g., a DNS service provided by the Windows operating system) may be made available to applications through a published port. The port, which is an abstraction of a communication channel, is associated with a text string that identifies that specific port. The operating system kernel typically maintains a list of open ports through which various services are made available to calling applications. As shown at FIG. 4, the method begins at step 401 with an application that may potentially be malicious (e.g., untrusted malware application 321 as shown at FIG. 3) requesting a particular service (e.g., a DNS service) which is not part of the local malware application or process, but rather is a service that is handled by another application in a separate process. As operating systems (e.g., Windows) are often structured to have generic services which perform particular tasks on behalf of applications, a particular request by a local application may often lead to the invocation of one or more generic services for performing particular tasks. For example, the malware application may use a Windows socket function called "gethostbyname" or "getaddrinfo", which are Wsock32.dll functions (API calls) that are designed to resolve textual representations and obtain an IP address. During the process of obtaining the requested IP address, a DNS service provided by the operating system may access the Internet to look up an IP address on a remote DNS server.

As a result of the initial request by the malware application, at step 402 there is an initial invocation of an operating system module or function at the "user" privilege level (e.g., in the user32 or kernel32 component 323 in ring 3 as shown at FIG. 3) for handling of this request in the local user process. The user level component determines that in order to have the requested service performed, a communication must be made in a particular format on a specific port or communication channel to obtain access to the service. The module frequently processes the request (e.g., formatting the request into a message in an appropriate format) and may consult a local cache to determine whether the requested information is already locally known. For example, the Windows socket (e.g., Wsock32.dll) function "gethostbyname", when invoked to resolve a host name to an IP address, will usually first check locally for a matching host name entry. If no matching host name entry is found locally, this module determines that it will then need to invoke a service (e.g., a DNS service) to obtain the IP address that matches the host name.

At step 403, an attempt is made to open a communication channel (e.g., "port") to the desired service (e.g., DNS service). To invoke a service, a communication channel must first be opened through the operating system kernel (e.g., Win32 kernel or NTOS kernel in ring 0 as shown in block 325 at FIG. 3) to the desired service (e.g., by an operating system API call such as "NtCreatePort" for opening a port). A communication channel though the kernel is required so that the kernel can facilitate communication with the requested service or process (e.g., the DNS service) which runs in a different address space of the machine. In essence, the kernel operating system services are used to send messages back and forth to the service or process of interest. For example, the kernel32 (at the user level) communicates with the NTOS kernel (at the kernel level) and indicates that it wants to create a connection to a "RPC DNS resolve" service. The NTOS kernel has a list of different kinds of services (such as RPC DNS resolve) and a list of open ports to such services, which are described by a string. The NTOS kernel facilitates communications between the application (e.g., malware) and the service (e.g., RPC DNS resolve) as these two applications are in different memory spaces of the machine.

The attempt to open a communication channel (port) to the desired service is intercepted and re-routed to the IPCC at step 404. The attempt to open a port is a good point at which to examine what is occurring as the attempt provides a good indication of what the application (e.g., the malware application in this example) is trying to accomplish, depending on the service that is being invoked. The services that are available are typically well-known services, so it can be determined what the application is attempting to do through the use of a particular service. For example, if the malware application wants to communicate with the DNS service, it can be determined that the DNS service will attempt a DNS lookup on behalf of the malware application (e.g., by looking at parameters of the open port request). Additional reasons for intercepting the attempt to open a port include better error handling and reduced impact on system performance compared to trapping this activity at a later point in the process. Also, it can be more difficult to intercept the appropriate messages at a later point.

In the currently preferred embodiment, these attempts to open a communication channel are intercepted by rerouting them from a dispatch table to the IPCC. Communications between kernel32 and the NTOS kernel or between user32 and the Win32 kernel are based upon a dispatch table. The IPCC generally operates by modifying (or patching) this dispatch table to re-route the request for particular services to itself so that the IPCC can decide whether or not to allow the request before associated lower level operating system calls may proceed. At this point the IPCC can also determine the currently running process or application which is attempting to open the connection (e.g., the malware application in this example). For example, the "GetCurrentProcess" and "GetCurrentProcessId" Windows API functions may be invoked to determine the current application or process attempting to open the connection.

At step 405, the IPCC passes the request to the TrueVector engine (VS_MON), which includes a rules engine (or database), to determine whether or not to block the attempt by the specified application (e.g., the malware application) to open a channel to the target service (e.g., DNS service). In the case of this specific invocation of the DNS service, the rules engine of the currently preferred embodiment treats this attempt like a request for Internet access by the malware application given that ultimately the DNS service will obtain Internet access to lookup an IP address. The rules database is consulted to determine whether the malware application is a known application and applies any established rule if the application is known. A known application may have an established rule which indicates the application is trusted (i.e., approved for Internet access), untrusted (blocked from accessing the Internet), or which provides for requesting a decision from the user (or from a centralized administrative service) about whether or not to permit access. If the application is not known, an established rule may be applied (e.g., block Internet access by unknown applications) or the user may be informed and asked to decide whether to allow access by the malware application using the DNS service.

As an alternative to consulting an external rules engine, the IPCC may include rules and/or logic to evaluate attempts to access a service itself. In this event, the IPCC would examine the attempt and determine whether or not to permit access based upon established policies or rules. Those skilled in the art will appreciate that a number of other variations for evaluating attempts to access a service are also available, which may be appropriately addressed by the present invention. For example, the IPCC may handle certain access attempts (e.g., deny access to a known, "untrusted" application) while invoking an external rules engine in other situations, depending on such factors as the complexity of the decision-making process and the impact of consulting an external rules engine on system performance. Further description of a rules engine component for security and behavioral policy definition and enforcement is provided in commonly-owned application Ser. No. 10/159,820, filed May 31, 2002, entitled "System and Method for Security Policy Arbitration," the disclosure of which is hereby incorporated by reference in its entirety, including any appendices or attachments thereof, for all purposes.

At step 406, the rules engine (or the IPCC) determines whether to permit or block access to the service by the application. In the currently preferred embodiment, the rules engine of the TrueVector engine returns a status of "yes" (allow access), "no" (deny or block access), or "ask" (ask for permission). "Ask" may include asking the user or a non-user such as a centralized administrative service about whether or not to permit access by the application. If an external rules engine was consulted, the answer is returned to the IPCC by the rules engine.

At step 407, the IPCC permits or blocks the attempt by the application to access the service. If the answer that is determined at step 406 is to allow the request for service, the request is forwarded to the original destination routine (e.g., by consulting a fix-up table that is maintained to track the handling of the re-routed requests). In other words, the communication (or request) that was re-routed to the IPCC is re-dispatched to the originally specified recipient (e.g., the DNS service). Otherwise, if the answer is to block (deny) the attempt, then a response is returned to the requesting application (e.g., malware) with an appropriate error message, such as "connection refused", "service not available", or the like. After the attempt is allowed or denied, the handling of this exemplary request is completed. At this point the system reenters a steady state ready to handle future requests for access.

Another aspect of the present invention is to provide a mechanism for regulating interprocess communication amongst applications and services so as to prevent a rogue application from controlling or misusing another application or service. Applications (or services) to be protected are registered with the security system of the present invention and aspects regarding how these applications are to be protected are described. Communications with registered applications are then regulated by the security system of the present invention as hereinafter described.

Figure 5:
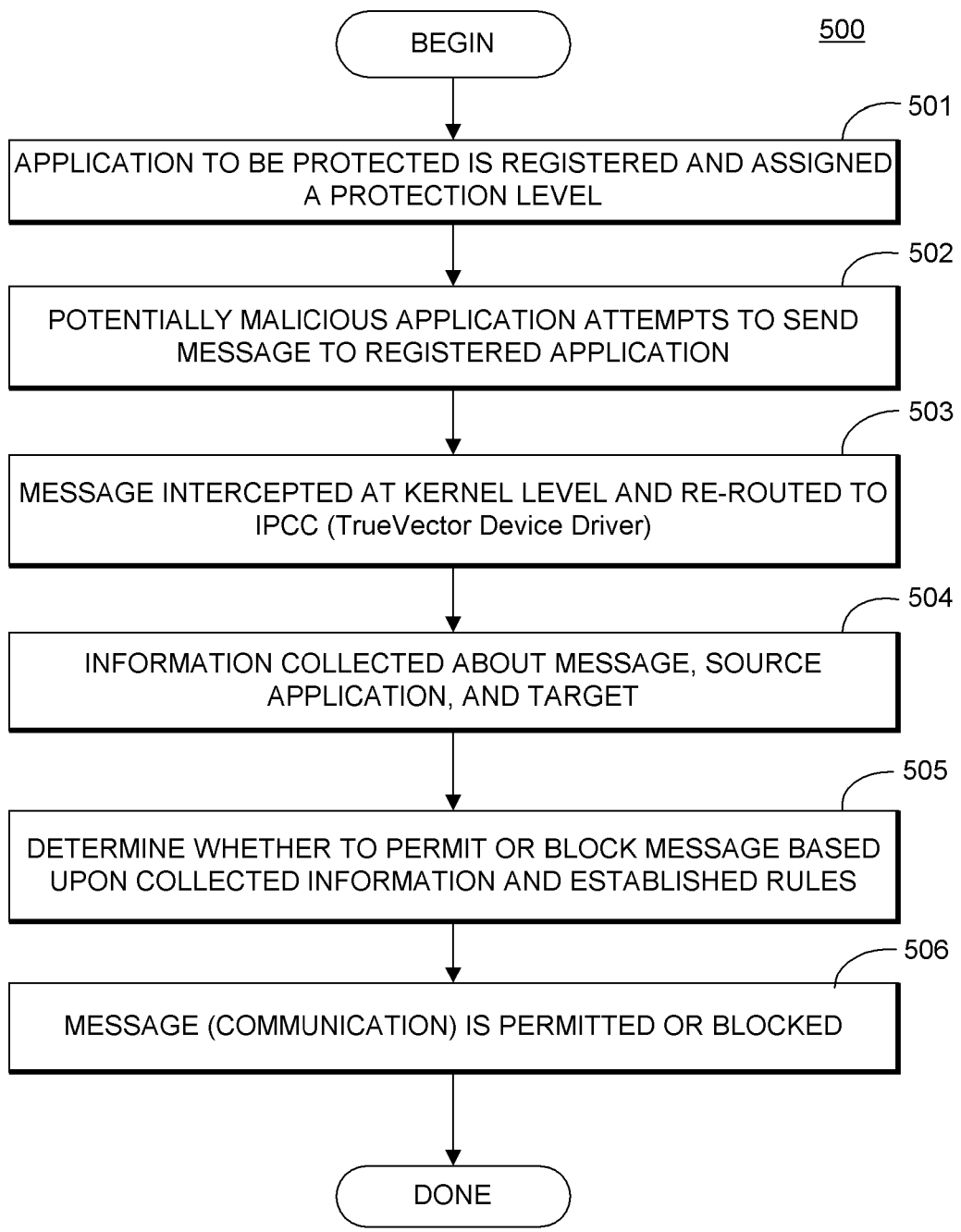
FIG. 5 presents a flowchart illustrating the high-level methods of operation of the system of the present invention in regulating interprocess communications between applications.

FIG. 5 comprises a flowchart 500 illustrating the high-level methods of operation of the system of the present invention in regulating interprocess communications between applications. As with the method in FIG. 4, the following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server). The following discussion uses the operations of the system of the present invention in a Microsoft Windows operating environment as an example, however a similar approach may also be used in other operating environments.

The method commences at step 501 with the registration of a particular application (e.g., the ZoneAlarm firewall manager 341 as shown at FIG. 3). In the presently preferred embodiment, an application to be protected is registered with the Interprocess Communication Controller (IPCC) component 349 of the TrueVector device driver 345 through the use of the TrueVector engine (VS_MON) 343, all as shown at FIG. 3. As previously described, the firewall manager application can be registered as a protected application and assigned a protection level that prevents other applications from posting particular types of messages (communications) to the firewall manager. The types of messages that the application is to be guarded against (i.e., messages to be blocked) are also specified during this registration process.

At step 502, a potentially malicious application (e.g., malware application 321 as shown at FIG. 3), attempts to send a message to the registered application (e.g., the ZoneAlarm firewall manager 341 as shown at FIG. 3). The malware application may send a wide variety of communications (messages) to the firewall manager in an attempt to disable the firewall manager or otherwise circumvent the security measures provided by the security system. For example, the firewall manager may, from time to time, present a dialog box in the user interface to notify the user of particular events. This dialog box may, for instance, pop-up to inform the user of an attempt to access the Internet by a given application and request a decision from the user as to whether or not such access should be permitted. The malware application may attempt to disable or circumvent the firewall (end point security module) by waiting until this dialog box is presented, and then sending user input-based messages, such as keystrokes and mouse input, to the firewall manager. For example, input may be sent which indicates that the malware application should be permitted to access the Internet and/or that it should be categorized as a trusted application (i.e., added to a list of applications permitted to access the Internet).

There are a number of other ways by which a malicious application may try to attack another application (e.g., an end point security application). The malware application may send user input messages using a Microsoft Windows "SendMessage" function (or "PostMessage", or the like) which sends a message to one or more specified window(s) as described above. As another example, the malware application could also send another application a message to quit (i.e., cease operating) or send other messages (e.g., "WM_COMMAND" messages) seeking to exploit vulnerabilities in the application and/or operating system to breach security. Those skilled in the art will appreciate that there are a number of ways in which a malicious application can attempt to disable or circumvent another application. As another example, in the case of Microsoft Outlook, the Outlook application publishes certain communication channels that are not Windows messages, but may comprise ports or other ways of communicating. These communication channels are capable of being abused by rogue applications. One of the difficulties in regulating abusive messages is that it is often difficult to determine the source of a given message. An application at the user level of the system (such as the firewall manager in this example) may be unable to defend itself against this type of attack because it cannot determine whether or not a given request that is received is legitimate.

At step 503, the message sent by the application is intercepted at the kernel level and redirected (or re-routed) to the IPCC. A message sent via the "SendMessage" function at the user level is normally received and translated at the kernel level before being dispatched to its intended destination, and a dispatch table is typically employed at the kernel level similar to that previously described above. In the currently preferred embodiment, the message (or communication) is intercepted by modifying this dispatch table to re-route messages to the IPCC so that the IPCC can decide whether or not to permit the communication to be sent to the target destination.

Next, at step 504 information about the message, the source application (process), and the target application are collected. This information is typically extracted from the communication (e.g., extracted from Windows message parameters). The specific information that is extracted or otherwise obtained by the IPCC component of the TrueVector device driver varies depending upon the type of message or communication that is involved.

Based upon the collected information about the message, the source application, and the target, at step 505 a determination is made as to whether the communication should be permitted (i.e., allowed to proceed to the target) or blocked. This determination typically first involves determining whether the target application is a protected application (i.e., the target application was previously registered as a protected application as described above). If the target application is a protected application, the type of message (communication) is then evaluated to determine if it is a type of communication that the target application is to be protected against (based upon the rules established above regarding what is protected). In the currently preferred embodiment, this determination is made directly in the TrueVector device driver at the kernel level (i.e., without the need to consult an external rules engine) in the interests of minimizing the impact on system performance. However, the determination may also be made by an external rules engine, as desired.

As described above with respect to evaluation of attempts to access a communication channel, those skilled in the art will appreciate that a number of alternatives are available about how the determination to allow or reject communications may be made. For example, the device driver (IPCC) may make the determination itself in many cases (e.g., for particular types of messages) and may invoke an external rules engine to handle other types of communications. As another example, rules may be established to provide that the device driver should reject all messages to a first target application, should allow all messages to a second target application, and should refer all messages to a third target to an external rules engine (e.g., a rules engine component of the TrueVector engine), and so on and so forth. In some cases the rules engine may also, in turn, consult additional resources (e.g., an external web server on a different machine or location) in the process of determining whether or not to permit a given communication attempt.

Based upon the determination made by the device driver and/or rules engine, at step 506 the message (or communication) is either permitted (i.e., allowed to proceed) or rejected. If the message is allowed to proceed, the message is re-dispatched to the original target (e.g., by consulting a fix-up table that is maintained to track the handling of messages). Otherwise, if the decision is made to block the communication, then a response is returned to the requesting application (e.g., malware) with an appropriate error message. After the attempt is allowed or denied, the handling of this message is completed. The above process may then be repeated for regulating additional interprocess communications.

Detailed Internal Operation

Components of Interprocess Communication Controller

Figure 6:
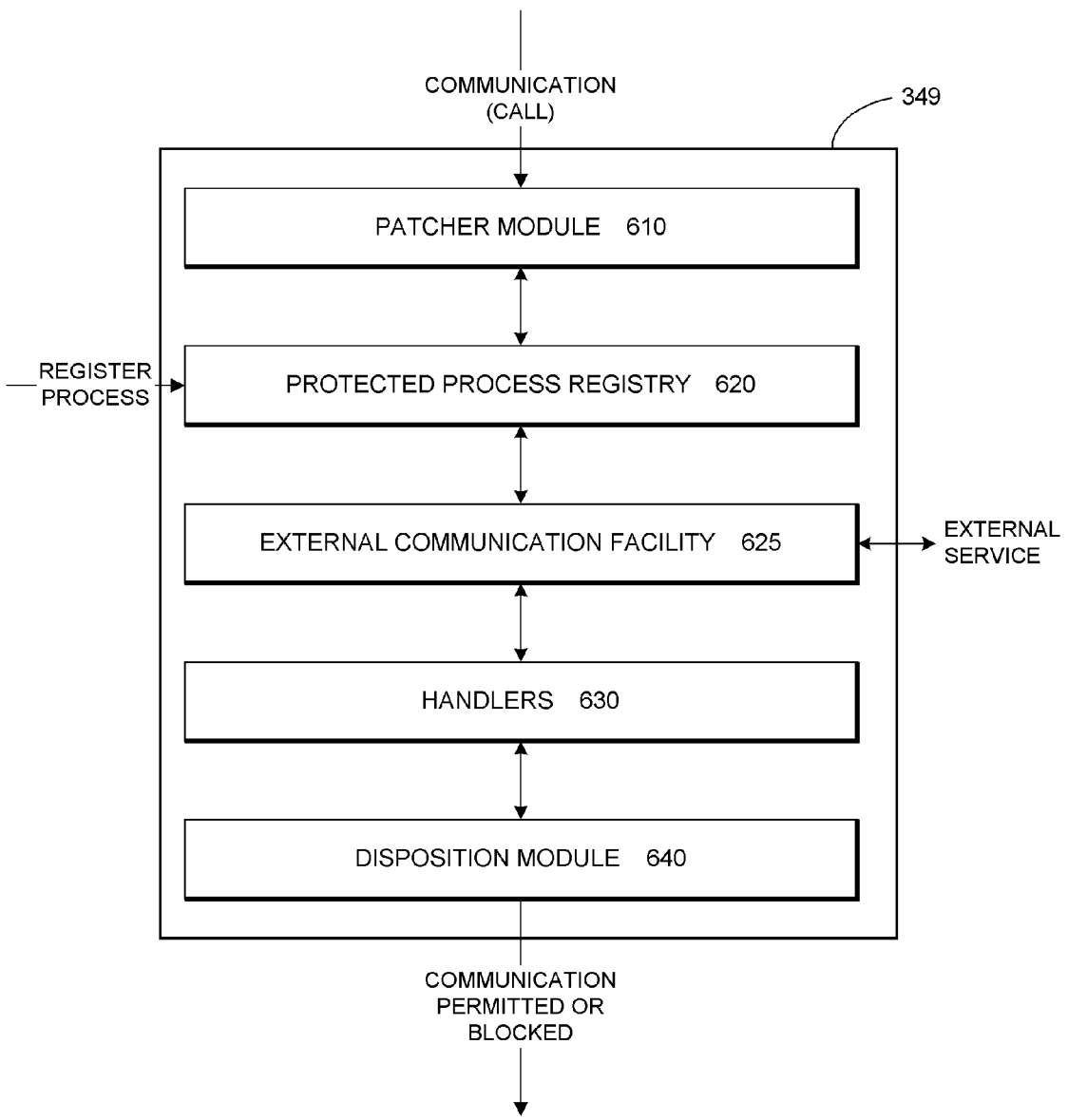
FIG. 6 is a block diagram illustrating the components of the Interprocess Communication Controller (IPCC).

FIG. 6 is a block diagram illustrating the components of the Interprocess Communication Controller (IPCC) 349 of the currently preferred embodiment. As shown, the components include a patcher module 610, a protected process registry 620, an external communication facility 625, handlers 630, and a disposition module 640. Each of these components will now be described.

The patcher module 610 serves to intercept and redirect operating system calls to handlers 630 of the IPCC 349. More particularly, the patcher module 610 locates the dispatch tables that are used by the system to take a call received from the user level and dispatch the call to the appropriate lower level operating system routines of the kernel as illustrated at FIG. 3. The patcher module 610 generally redirects the call to the IPCC by replacing the original destination in the dispatch table with a pointer to the appropriate handler routines 630 of the IPCC. The original destination address is also retained as hereinafter described. In this fashion operating system calls are redirected to the handlers 630 for determining whether or not the communication (call) should be allowed or blocked. The original destination information from the dispatch table is retained so that the call can be forwarded to the original destination if the IPCC authorizes (i.e., permits) the communication.

The protected process registry 620 provides a facility for registering a process (or other protected items) in order to protect such process (or item) from other processes as provided in one embodiment of the present invention. A user or administrator may register a process that is to be protected with the protected process registry 620 of the IPCC, so that the IPCC can determine whether or not to permit other processes or applications to communicate with the registered process. The protected process registry 620 may also (optionally) specify what types of protection should be provided (e.g., specifying communications a process should be protected against).

The external communication facility 625 provides for (optional) forwarding of certain items to an external service (e.g., the rules engine of the TrueVector engine). In the currently preferred embodiment, instead of making all decisions locally within the IPCC, in certain cases a message may be sent to an external service (e.g., the rules engine of the TrueVector engine) asking the external service to make a decision as to whether to permit or block a particular communication. In addition, the external communication facility 625 may also send messages synchronously or asynchronously to an external service (e.g., the TrueVector engine) to inform an external service of specific activity and/or to log certain actions that have been taken by the IPCC.

The handlers 630 are the actual handlers that examine and make decisions regarding intercepted communications or calls. The handlers 630 look at calls (i.e., messages or communications) that have been redirected to the IPCC and their parameters and make decisions about how to handle them. For example, a handler may decide whether a call can be handled locally or should be forwarded to another module (e.g., the TrueVector engine) for decision making. A handler may also decide whether a call or message can be forwarded on to its original destination or blocked.

The disposition module 640 manages appropriate routing of a communication after its disposition has been determined. A handler that is handling a communication will usually have a disposition for the communication (i.e., to allow or to block the communication). If a call is allowed, the disposition module 640 causes the call to be forwarded on to its original destination. For example, if a DNS service was originally invoked, the disposition module 640 would cause the call to be passed on to the DNS service if the handler 630 determined that the call was allowable. However, if the handler determined that a call or message is to be blocked, an error message or other appropriate indication is returned to the calling process or application to indicate this fact.

Intercepting and Monitoring Local Procedure Calls

The following "vslpc_nt.c" module is a component of the TrueVector driver that intercepts and monitors local procedure calls (LPCs) in a Windows NT environment.

1: /* vslpc_nt.c (vsdatant.sys)
2: Driver component for WinNT, hooking/monitoring of LPC calls */
3: #include "ntddk.h"
4: #include "stdarg.h"
5: #include "stdio.h"
6: #include "vsdatant.h"
7: #include "vserror.h"
8: #include "vsdriver.h"
9: #ifdef_DEBUG
10: #define_DEBUG_LPC
11: #endif
12: // Various data structures
13: typedef struct_LPC_SECTION_OWNER_MEMORY {
14: ULONG Length;

```
15: HANDLE SectionHandle;
16: ULONG OffsetinSection;
17: ULONG ViewSize;
18: PVOID ViewBase;
19: PVOID OtherSideViewBase;
20: } LPC_SECTION_OWNER_MEMORY, *PLPC_SECTION_OWNER_MEMORY;
21: typedef struct_LPC_SECTION_MEMORY {
22: ULONG Length;
23: ULONG ViewSize;
24: PVOID ViewBase;
25: } LPC_SECTION_MEMORY, *PLPC_SECTION_MEMORY;
26: typedef struct_LPC_MESSAGE {
27: USHORT DataLength;
28: USHORT Length;
29: USHORT MessageType;
30: USHORT DataInfoOffset;
31: CLIENT_ID ClientId;
32: ULONG MessageId;
33: ULONG CallbackId;
34: } LPC_MESSAGE, *PLPC_MESSAGE;
35: // LPC call prototypes
36: typedef NTSTATUS
37: (NTAPI
38: *NT_CONNECT_PORT) ( OUT PHANDLE ClientPortHandle,
39: IN PUNICODE_STRING ServerPortName,
40: IN PSECURITY_QUALITY_OF_SERVICE SecurityQos,
41: IN OUT PLPC_SECTION_OWNER_MEMORY ClientSharedMemory,
42: OUT PLPC_SECTION_MEMORY ServerSharedMemory,
43: OUT PULONG MaximumMessageLength,
44: IN OUT PVOID ConnectionInfo,
45: IN OUT PULONG ConnectionInfoLength);
46: NTSYSAPI
47: NTSTATUS
48: NTAPI
49: NtConnectPort( OUT PHANDLE ClientPortHandle,
50: IN PUNICODE_STRING ServerPortName,
51: IN PSECURITY_QUALITY_OF_SERVICE SecurityQos,
52: IN OUT PLPC_SECTION_OWNER_MEMORY ClientSha redMemory,
53: OUT PLPC_SECTION_MEMORY ServerSharedMemory,
54: OUT PULONG MaximumMessageLength,
55: IN OUT PVOID ConnectionInfo,
56: IN OUT PULONG ConnectionInfoLength);
57: #ifdef_DEBUG_LPC
58: #define SECURE_CONNECT_PORT_SERVICE_NT 0x00000000
59: #define SECURE_CONNECT_PORT_SERVICE_2K 0x000000b8
60: #define SECURE_CONNECT_PORT_SERVICE_XP 0x000000d2
61: typedef NTSTATUS
62: (NTAPI
63: *NT_SECURE_CONNECT_PORT) (OUT PHANDLE ClientPortHandle,
64: IN PUNICODE_STRING ServerPortName,
65: IN PSECURITY_QUALITY_OF_SERVICE SecurityQos,
66: IN OUT PLPC_SECTION_OWNER_MEMORY ClientSharedMemory,
67: PVOID pUnknown,
68: OUT PLPC_SECTION_MEMORY ServerSharedMemory,
69: OUT PULONG MaximumMessageLength,
70: IN OUT PVOID ConnectionInfo,
71: IN OUT PULONG ConnectionInfoLength);
72: /* Not exported by ntoskrnl
73: NTSYSAPI
74: NTSTATUS
75: NTAPI
76: NtSecureConnectPort(OUT PHANDLE ClientPortHandle,
77: IN PUNICODE_STRING ServerPortName,
78: IN PSECURITY_QUALITY_OF_SERVICE SecurityQos,
79: IN OUT PLPC_SECTION_OWNER_MEMORY ClientSharedMemory,
80: PVOID pUnknown,
81: OUT PLPC_SECTION_MEMORY ServerSharedMemory,
82: OUT PULONG MaximumMessageLength,
83: IN OUT PVOID ConnectionInfo,
84: IN OUT PULONG ConnectionInfoLength);
85: */
86: #define CREATE_PORT_SERVICE_NT 0x00000000
87: #define CREATE_PORT_SERVICE_2K 0x00000028
88: #define CREATE_PORT_SERVICE_XP 0x0000002e
89: typedef NTSTATUS
90: (NTAPI
91: *NT_CREATE_PORT) (OUT PHANDLE PortHandle,
92: IN POBJECT_ATTRIBUTES ObjectAttributes,
93: IN ULONG MaxConnectInfoLength,
94: IN ULONG MaxDataLength,
95: IN OUT PULONG Reserved OPTIONAL);
96: /* Not exported by ntoskrnl
97: NTSYSAPI
98: NTSTATUS
99: NTAPI
100: NtCreatePort(OUT PHANDLE PortHandle,
101: IN POBJECT_ATTRIBUTES ObjectAttributes,
102: IN ULONG MaxConnectInfoLength,
103: IN ULONG MaxDataLength,
104: IN OUT PULONG Reserved OPTIONAL);
105: */
106: #endif //_DEGUG_LPC
107: // Hook handlers and handles
108: NT_CONNECT_PORT ConnectPortHandler=NULL;
109: HOOK_FUNCTION hConnectPort={0};
110: #ifdef_DEBUG_LPC
111: NT_SECURE_CONNECT_PORT SecureConnectPortHandler=NULL;
112: HOOK_FUNCTION hSecureConnectPort={0};
113: NT_CREATE_PORT CreatePortHandler=NULL;
114: HOOK_FUNCTION hCreatePort={0};
115: #endif //_DEBUG_LPC
116: NTSTATUS___stdcall OnProcessLpcDnsAccess (DWORD dwProcessID)
117: { // We are generating a "pseudo" WSock message here, not a process message
118: PVSMSG_STREAM pMsg;
119: PHOOKREQUEST pHook=pWSockHook;
120: NTSTATUS Status=STATUS_SUCCESS;
121: if (dwProcessID==dwMonitorProcessID)
122: return STATUS_SUCCESS;
123: if(pHook)
124:  { pMsg=NewMessage(pHook, sizeof(VSMSC_STREAM), GetCurrentProcessID( ),
```

125: GetCurrentThreadID( ), 0, 0,0);
126: if (pMsg)
127: { pMsg->dwMsgFlags|=MFM_NEEDREPLY;
128: pMsg->dwMsgLevel=MSC_LEVEL_INFO_LOW;
129: Status=PutMessage(pHook, &pMsg, MCWSOCK_LPC_DNS_ACCESS_BEFORE,
130: NULL, 0, 0);
131: FreeMessage(pHook, (PBASEVSMSC)pMsg);
132: if (Status)
133: Status=STATUS_ACCESS_DENIED;
134: }
135: }
136: return Status;
137: }
138: NTSTATUS
139: NTAPI
140: HookConnectPort( OUT PHANDLE ClientPortHandle,
141: IN PUNICODE_STRING ServerPortName,
142: IN PSECURITY_QUALITY_OF_SERVICE SecurityQos,
143: IN OUT PLPC_SECTION_OWNER_MEMORY ClientSharedMemory,
144: OUT PLPC_SECTION_MEMORY ServerSharedMemory,
145: OUT PULONG MaximumMessageLength,
146: IN OUT PVOID ConnectionInfo,
147: IN OUT PULONG ConnectionInfoLength)
148: { NTSTATUS Status=STATUS_SUCCESS;
149: CHAR cPortName[256]="";
150: DWORD dwLen=0;
151: DWORD dwProcessID=GetCurrentProcessID( );
152: if (ServerPortName)
153: dwLen=UnicodeStringToChar(*ServerPortName, cPortName, sizeof(cPortName));
154: // DNS request to services.exe
155: if (lstrcmpKcPortName, "\\RPC Control\\DNSResolver")==0)
156: {Status=OnProcessLpcDnsAccess(dwProcessID);
157: }
158: if ((Status==STATUS_SUCCESS))
159: { if (ConnectPortHandler)
160: { Status=ConnectPortHandler(ClientPortHandle, ServerPortName,
161: SecurityQos, ClientSharedMemory, ServerSharedMemory,
162: MaximumMessageLength, ConnectionInfo,
163: ConnectionInfoLength);
164: }
165: else
166: {Status=NtConnectPort( ClientPortHandle, ServerPortName, SecurityQos,
167: ClientSharedMemory, ServerSharedMemory, MaximumMessageLength, ConnectionInfo,
168: ConnectionInfoLength);
169: }
170: }
171: #ifdef_DEBUG
172: if (Status==STATUS_SUCCESS)
173: DbgPrint("[LPC NtConnectPort] ""%s"" (%x) OK - Port %x\n",
174: cPortName, dwProcessID, ClientPortHandle ? *ClientPortHandle : 0);
175: else
176: DbgPrint("[LPC NtConnectPort] ""%s"" (%x) FAIL - Status %x\n",
177: cPortName, dwProcessID, Status);
178: #endif //_DEBUG
179: return Status;
180: }
181: #ifdef_DEBUG_LPC
182: NTSTATUS
183: NTAPI
184: HookSecureConnectPort( OUT PHANDLE ClientPortHandle,
185: IN PUNICODE_STRING ServerPortName,
186: IN PSECURITY_QUALITY_OF_SERVICE SecurityQos,
187: IN OUT PLPC_SECTION_OWNER_MEMORY ClientSharedMemory,
188: PVOID pUnknown,
189: OUT PLPC_SECTION_MEMORY ServerSharedMemory,
190: OUT PULONG MaximumMessageLength,
191: IN OUT PVOID ConnectionInfo,
192: IN OUT PULONG ConnectionInfoLength)
193: { NTSTATUS Status=STATUS_SUCCESS;
194: CHAR cPortName[256]="";
195: DWORD dwLen=0;
196: DWORD dwProcessID=GetCurrentProcessID( );
197: if (ServerPortName)
198: dwLen=UnicodeStringToChar(*ServerPortName, cPortName, sizeof(cPortName));
199: // DNS request to services.exe
200: if (lstrcmpKcPortName, "\\RPC Control\\DNSResolver")==0)
201: { Status=OnProcessLpcDnsAccess(dwProcessID);
202: }
203: if ((Status==STATUS_SUCCESS))
204: { if (ConnectPortHandler)
205: { Status=SecureConnectPortHandler( ClientPortHandle, ServerPortName,
206: SecurityQos, ClientSharedMemory, pUnknown, ServerSharedMemory,
207: MaximumMessageLength, ConnectionInfo, ConnectionInfoLength);
208: }
209: else
210: {
211: /* Status=NtSecureConnectPort( ClientPortHandle, ServerPortName, SecurityQos,
212: ClientSharedMemory, pUnknown, ServerSharedMemory, MaximumMessageLength,
213: ConnectionInfo, ConnectionInfoLength);*/
214: Status=STATUS_ACCESS_DENIED;
215: }
216: }
217: #ifdef_DEBUG
218: if (Status==STATUS_SUCCESS)
219: DbgPrint("[LPC NtSecureConnectPort] ""%s"" (%x) OK - Port %x\n",
220: cPortName, dwProcessID, ClientPortHandle *ClientPortHandle : 0);
221: else
222: DbgPrint("[LPC NtSecureConnectPort] ""%s"" (%x) FAIL - Status %x\n",
223: cPortName, dwProcessID, Status);
224: #endif //.DEBUG
225: return Status;
226: }
227: NTSTATUS
228: NTAPI
229: HookCreatePort( OUT PHANDLE PortHandle,
230: IN POBJECT_ATTRIBUTES ObjectAttributes,
231: IN ULONG MaxConnectInfoLength,

```
232: IN ULONG MaxDataLength,
233: IN OUT PULONG Reserved OPTIONAL)
234: { NTSTATUS Status=STATUS_SUCCESS;
235: CHAR cPortName[256]="";
236: DWORD dwLen=0;
237: DWORD dwProcessID=GetCurrentProcessID( );
238: if (ObjectAttributes && ObjectAttributes->Object-
Name)
239:      dwLen=UnicodeStringToChar(*(ObjectAttributes-
>ObjectName), cPortName, sizeof(cPortName));
240: if ((Status==STATUS_SUCCESS))
241: { if (CreatePortHandler)
242: { Status=CreatePortHandler( PortHandle, ObjectAt-
tributes, MaxConnectInfoLength,
243: MaxDataLength, Reserved);
244: }
245: else
246: {/*Status=NtCreatePort( PortHandle, ObjectAttributes,
MaxConnectInfoLength,
247: MaxDataLength, Reserved); */
248: Status=STATUS_ACCESS_DENIED;
249: }
250: }
251: #ifdef_DEBUG
252: if (Status==STATUS_SUCCESS)
253: DbgPrint("[LPC NtCreatePort] ""%s"" (%x) OK - Port
%x\n",
254: cPortName, dwProcessID, PortHandle ?*PortHandle :
0);
255: else
256: DbgPrint("[LPC NtCreatePort] ""%s"" (%x) FAIL -
Status %x\n",
257: cPortName, dwProcessID, Status);
258: #endif //_DEBUG
259: return Status;
260: }
261: #endif //_DEGUG_LPC
262:
263: NTSTATUS StartTrackLPC( )
264: {
265: NTSTATUS Status;
266: Status=HookInt2EService( &hConnectPort, HookCon-
nectPort,
267: FindInt2EService(NtConnectPort, 0));
268: if (Status==STATUS_SUCCESS)
269: ConnectPortHandler=hConnectPort.pOldFunction;
270: else
271: Status=STATUS_UNSUCCESSFUL;
272: #ifdef_DEBUG_LPC
273: Status=HookInt2EService( &hSecureConnectPort,
274: HookSecureConnectPort,
275:     FindInt2EServiceByID(SECURE_CONNECT_
PORT_SERVICE));
276: if (Status==STATUS_SUCCESS)
277:
SecureConnectPortHandler=hSecureConnectPort.pOldFunction;
278: else
279: Status=STATUS_UNSUCCESSFUL;
280: Status=HookInt2EService( &hCreatePort, HookCreate-
Port,
281: FindInt2EServiceByID(CREATE_PORT_SERVICE));
282: if (Status==STATUS_SUCCESS)
283: CreatePortHandler=hCreatePort.pOldFunction;
284: else
285: Status=STATUS_UNSUCCESSFUL;
286: #endif //_DEGUG_LPC
287: return Status;
288: }
289: NTSTATUS StopTrackLPC( )
290: {
291: NTSTATUS Status;
292: Status=UnhookInt2EService(&hConnectPort);
293: #ifdef_DEBUG_LPC
294: Status=UnhookInt2EService(&hSecureConnectPort);
295: Status=UnhookInt2EService(&hCreatePort);
296: #endif //_DEGUG_LPC
297: return Status;
298: }
```

A "StartTrackLPC( )" function commencing at line 263 of the above "vslpc_nt.c" module is an initialization routine. As shown at lines 266-267 a call is made to a "HookInt2EService" utility routine that asks it to hook (i.e., intercept calls to) a particular routine. In this case, the utility routine is called to hook a routine named "NtConnectPort" which is a routine that a process or application would use to attempt to communicate with a service such as the DNS service. The "HookInt2EService" utility routine locates the correct dispatch table and obtains an index into the dispatch table ("FindInt2EService"). The "Start-TrackLPC( )" function also indicates the address to which the call should be redirected, and returns a data structure that includes the address to which the call was originally directed. The data structure is retained so that the address to which the call was initially directed can be retrieved. In this example, two other functions that are of interest are also hooked in the same manner. A "SECURE_CONNECT_PORT_SERVICE" is hooked as provided at lines 273-275. In addition, calls to a "CREATE_PORT_SERVICE" function are intercepted as shown at lines 280-281.

The "StopTrackLPC( )" routine which commences above at line 289 is basically the inverse of the "StartTrackLPC( )" function. The "StopTrackLPC( )" routine "unhooks" the specified functions and restores the dispatch table to its original state.

The "HookConnectPort" routine at lines 140-180 is a routine that is called by the above-described "Start-TrackLPC( )" function. Of particular interest, it converts a "ServerPortName" parameter to a character string as shown at line 153. The resulting character string is then compared to the known string name of a service "\\RPC Control\\DNSResolver" as shown at line 155. In this example, the known string name represents the known name of the DNS service which is the name used system-wide to identify the DNS service. If the comparison is positive, a utility routine named "OnProcessLpcDnsAccess" is then called as shown at line 156. This utility routine sends a message to the user level and invokes the user level to determine whether or not to permit DNS access.

The "OnProcessLpcDnsAccess" function (described in more detail below) may cause a pop-up to be displayed in the user interface to ask the user as to whether or not to permit access to the DNS service. Alternatively, an established policy or rule may be consulted to determine whether or not access should be permitted. As also shown at line 156, an identifier of the calling process ("dwProcessID") is used to identify the calling process that is requesting access to the DNS service. A decision may then be made by consulting the user or applying an established policy as to whether this particular calling process should be permitted to use the DNS service.

If a status of "STATUS_SUCCESS" is returned as provided at line 158 (and the original handler was saved as provided at line 159), the parameters of the original call are passed on to the appropriate operating system routine as shown at lines 160-164. If a status is other than "STATUS_SUCCESS" is returned, the status is simply returned as provided at line 179. For example, a status of "access denied" or "access failed" may be returned to the calling process or application in the event that the calling application is not permitted to access the DNS service. It should be noted that the status information that is returned at line 179 may indicate either success or failure.

The "HookSecureConnectPort" routine illustrated at lines 184-226 and the "HookCreatePort" routine illustrated at lines 229-260 operate in essentially the same manner as the "HookConnectPort" routine described above. These other routines may be called by the "StartTrackLPC( )" function depending on the service that the calling application is attempting to access. Calls to these routines may then be evaluated in the same manner as previously described.

The "OnProcessLpcDnsAccess" routine is illustrated at lines 116-137. As described above and as shown at line 116, the ID of the calling process is received as an input parameter to this routine. The process ID uniquely identifies the process or application that is attempting to access the DNS service. A message ("pMsg") is then created in an internal messaging format ("NewMessage") and two flags are set as shown at lines 124-128. The first flag is "MFM_NEEDREPLY" which indicates that the underlying messaging transports should wait for a reply before the call to the DNS service is allowed to proceed. Next at lines 129-130 the "PutMessage" is a pseudo Windows socket message that is called before execution. The result that is returned is a status indicating whether or not the communication (i.e., access to the DNS service) is to be permitted. Next, at lines 131-133 the message structure is freed and if any status is returned (i.e., "if (Status)"), the status is changed to "STATUS_ACCESS_DENIED" which is a standard error message that is understood by the calling function. The status is then returned as provided at line 136. The second aspect of the present invention in which a registered application is protected for certain communications will next be described.

Interception and Monitoring of GDI Calls

The following "vsgdi_nt.c" module is a component of the TrueVector driver that intercepts and monitors GDI (graphic device interface) messages in a Windows NT environment:

```
1: /* vsgdi_nt.c (vsdatant.sys)
2: Driver component for WinNT, hooking/monitoring of GDI calls
3: */
4: #include "ntddk.h"
5: #include "stdarg.h"
6: #include "stdio.h"
7: #include "vsdatant.h"
8: #include "vserror.h"
9: #include "vsdriver.h"
10: #define WM_KEYFIRST 0x0100
11: #define WM_KEYDOWN 0x0100
12: #define WM_KEYUP 0x0101
13: #define WM_CHAR 0x0102
14: #define WM_DEADCHAR 0x0103
15: #define WM_SYSKEYDOWN 0x0104
16: #define WM_SYSKEYUP 0x0105
17: #define WM_SYSCHAR 0x0106
18: #define WM_SYSDEADCHAR 0x0107
19: #define WM_KEYLAST 0x0108
20: #define WM_COMMAND 0x0111
21: #define WM_SYSCOMMAND 0x0112
22: #define WM_TIMER 0x0113
23: #define WM_MOUSEFIRST 0x0200
24: #define WM_MOUSEMOVE 0x0200
25: #define WM_LBUTTONDOWN 0x0201
26: #define WM_LBUTTONUP 0x0202
27: #define WM_LBUTTONDBLCLK 0x0203
28: #define WM_RBUTTONDOWN 0x0204
29: #define WM_RBUTTONUP 0x0205
30: #define WM_RBUTTONDBLCLK 0x0206
31: #define WM_M BUTTON DOWN 0x0207
32: #define WM_MBUTTONUP 0x0208
33: #define WM_MBUTTONDBLCLK 0x0209
34: #define WM_MOUSEWHEEL 0x020A
35: #define WM_XBUTTONDOWN 0x020B
36: #define WM_XBUTTONUP 0x020C
37: #define WM_XBUTTONDBLCLK 0x020D
38: #define WM_MOUSELAST 0x020D
39: #define BM_SETCHECK 0x00F1
40: #define BM_GETSTATE 0x00F2
41: #define BM_SETSTATE 0x00F3
42: #define BM_SETSTYLE 0x00F4
43: #define BM_CLICK 0x00F5
44: #define BM_GETIMAGE 0x00F6
45: #define BM_SETIMAGE 0x00F7
46: // GDI call prototypes
47:    #define    USER_MESSACE_CALL_SERVICE_NT 0x00000000
48:    #define    USER_MESSACE_CALL_SERVICE_2K 0x000011bc
49:    #define    USER_MESSAGE_CALL_SERVICE_XP 0x000011cc
50: typedef NTSTATUS
51: (NTAPI
52: *NT_USER_MESSAGE_CALL) ( HWND hWnd,
53: UINT Msg, WPARAM wParam,
54: LPARAM lParam, LRESULT lResult,
55: DWORD dwUnknown1, DWORD dwUnknown2);
56:    #define    USER_POST_MESSACE_SERVICE_NT 0x00000000
57:    #define    USER_POST_MESSACE_SERVICE_2K 0x000011cb
58:    #define    USER_POST_MESSAGE_SERVICE_XP 0x000011db
59: typedef NTSTATUS
60: (NTAPI
61: *NT_USER_POST_MESSAGE) ( HWND hWnd,
62: UINT Msg, WPARAM wParam,
63: LPARAM lParam);
64:    #define    USER_SEND_INPUT_SERVICE_NT 0x00000000
65:    #define    USER_SEND_INPUT_SERVICE_2K 0x000011e1
66:    #define    USER_SEND_INPUT_SERVICE_XP 0x000011f6
67: typedef UINT
68: (NTAPI
69: *NT_USER_SEND_INPUT) ( UINT nInputs, // count of input events
70: PVOID pInput, // struct_LPINPUT pInputs - array of input events
71: int cbSize // size of structure
72: );
73:    #define    USER_QUERY_WINDOW_SERVICE_NT 0x00000000
74:    #define    USER_QUERY_WINDOW_SERVICE_2K 0x000011d2
75:    #define    USER_QUERY_WINDOW_SERVICE_XP 0x000011e3
76: #define QUERY_WINDOW_PROCESS 0x00000000
77: #define QUERY_WINDOW_THREAD 0x00000001
```

```
78: typedef DWORD
79: (NTAPI
80: *NT_USER_QUERY_WINDOW) ( HWND hWnd,
DWORD dwQuery); // See QUERY_WINDOW_???
81:     #define     USER_GET_FOREGROUND_WIN-
DOW_SERVICE_NT 0x00000000
82:     #define     USER_GET_FOREGROUND_WIN-
DOW_SERVICE_2K 0x00001189
83:     #define     USER_GET_FOREGROUND_WIN-
DOW_SERVICE_XP 0x00001194
84: typedef HWND
85: (NTAPI
86: *NT_USER_GET_FOREGROUND_WINDOW) ( );
87:                    NT_USER_MESSAGE_CALL
UserMessageCallHandler=NULL;
88:                    NT_USER_POST_MESSAGE
UserPostMessageHandler=NULL;
89:                    NT_USER_SEND_INPUT
UserSendInputHandler=NULL;
90: HOOK_FUNCTION hUserMessageCall={0};
91: HOOK_FUNCTION hUserPostMessage={0};
92: HOOK_FUNCTION hUserSendInput={0};
93: // Utility stuff we need to call
94:                    NT_USER_QUERY_WINDOW
NtUserQueryWindow=NULL;
95:         NT_USER_GET_FOREGROUND_WINDOW
NtUserGetForegroundWindow=NULL;
96: #define MAX_PROCESS_FILTER 4
97:     DWORD     dwProcFilter[MAX_PROCESS_
FILTER]={0};
98: HWND hWndLast=NULL;
99: DWORD dwProcIdLast=0;
100: BOOL IsProcessFilter(DWORD dwProcessID)
101: {
102: DWORD n;
103: for (n=0; n<MAX_PROCESS_FILTER; n++)
104: {
105: if (dwProcFilter[n]==dwProcessID)
106: return TRUE;
107: }
108: return FALSE;
109: }
110: NTSTATUS AddProcessFilter(DWORD dwProcessID)
111: {
112: DWORD n;
113: for (n=0; n<MAX_PROCESS_FILTER; n++)
114: {
115: if (dwProcFilter[n]==dwProcessID)
116: return STATUS_SUCCESS;
117: if (dwProcFilter[n]==0)
118: {
119: dwProcFilter[n]=dwProcessID;
120: return STATUS_SUCCESS;
121: }
122: }
123: return STATUS_UNSUCCESSFUL;
124: }
125: NTSTATUS DelProcessFilter(DWORD dwProcessID)
126: {
127: DWORD n;
128: for (n=0; n<MAX_PROCESS_FILTER; n++)
129: {
130: if (dwProcFilter[n]==dwProcessID)
131: {
132: dwProcFilter[n]=0;
133: return STATUS_SUCCESS;
134: }
135: }
136: return STATUS_UNSUCCESSFUL;
137: }
138: BOOL WndContinue( HWND hWnd)
139: {
140: if (NtUserQueryWindow)
141: {
142: DWORD dwProcessID;
143: if (hWnd==hWndLast)
144: {
145: dwProcessID=dwProcIdLast;
146: }
147: else
148: {
149:          dwProcessID=NtUserQueryWindow(hWnd,
QUERY_WINDOW_PROCESS);
150: dwProcIdLast=dwProcessID;
151: hWndLast=hWnd;
152: }
153: if (IsProcessFilter(dwProcessID) &&
154: (dwProcessID !=GetCurrentProcessID( )))
155: {
156: return FALSE;
157: }
158: }
159: return TRUE;
160: }
161: BOOL MsgContinue( HWND hWnd, UINT Msg,
WPARAM wParam,
162: LPARAM lParam)
163: {
164: BOOL bProtect=FALSE;
165: BOOL bContinue=TRUE;
166: switch (Msg)
167: {
168: // If we're not interested in a message at all, let's find that
out first
169: //case WM_QUIT:
170: case WM_TIMER:
171: if (lParam==0)
172: break;
173: // fall through
174: case WM_KEYDOWN:
175: case WM_SYSKEYDOWN:
176: case WM_KEYUP:
177: case WM_SYSKEYUP:
178: case WM_LBUTTONDOWN:
179: case WM_LBUTTONUP:
180: case WM_RBUTTONDOWN:
181: case WM_RBUTTONUP:
182: case WM_COMMAND:
183: case BM_SETSTATE:
184: case BM_SETCHECK:
185: case BM_CLICK:
186: case WM_MBUTTONDOWN:
187: case WM_MBUTTONUP:
188: case WM_MBUTTONDBLCLK:
189: case WM_RBUTTONDBLCLK:
190: case WM_LBUTTONDBLCLK:
191: return WndContinue(hWnd);
192: }
193: return TRUE;
194: }
195: NTSTATUS
196: NTAPI
197: HookUserMessageCall( HWND hWnd, UINT Msg,
WPARAM wParam,
```

```
198: LPARAM lParam, LRESULT lResult,
199: DWORD dwUnknown1, DWORD dwUnknown2)
200: {
201: NTSTATUS Status=STATUS_SUCCESS;
202: if (MsgContinue(hWnd, Msg, wParam, lParam) &&
UserMessageCallHandler)
203: {
204:    Status=UserMessageCallHandler(hWnd, Msg, wParam, lParam,
205: lResult, dwUnknown1, dwUnknown2);
206: }
207: #ifdef _DEBUG
208: else
209: {
210: DbgPrint("[GDI NtUserMessageCall] BLOCKED: "
211: "hWnd %x, Msg %x, wParam %x, lParam %x, "
212: "Process %x\n", hWnd, Msg, wParam, lParam,
213: GetCurrentProcessID( ));
214: }
215: #endif //_DEBUG
216: return Status;
217: }
218: NTSTATUS
219: NTAPI
220: HookUserPostMessage( HWND hWnd, UINT Msg,
WPARAM wParam,
221: LPARAM lParam)
222: {
223: NTSTATUS Status=STATUS_SUCCESS;
224: if (MsgContinue(hWnd, Msg, wParam, lParam) &&
UserPostMessageHandler)
225: {
226:    Status=UserPostMessageHandler(hWnd, Msg, wParam, lParam);
227: }
228: #ifdef _DEBUG
229: else
230: {
231: DbgPrint("[GDI NtUserPostMessage] BLOCKED: "
232: "hWnd %x, Msg %x, wParam %x, lParam %x, "
233: "Process %x\n", hWnd, Msg, wParam, lParam,
234: CetCurrentProcessID( ));
235: }
236: #endif //_DEBUG
237: return Status;
238: }
239: UINT
240: NTAPI
241: HookUserSendInput( UINT nInputs, // count of input events
242: PVOID pInputs, // struct_LPINPUT pInputs - array of input events
243: int cbSize) // size of structure
244: {
245: HWND hWnd=0;
246: if (NtUserGetForegroundWindow &&
247:    WndContinue(hWnd=NtUserGetForegroundWindow( )) &&
248: UserSendInputHandler)
249: {
250:    return UserSendInputHandler(nInputs, pInputs, cbSize);
251: }
252: #ifdef _DEBUG
253: else
254: {
255: DbgPrint("[GDI NtUserSetInput] BLOCKED: "
256: "hWnd %x, Process %x\n",
257: hWnd, GetCurrentProcessID( ));
258: }
259: #endif //_DEBUG
260: return 0;
261: }
262: NTSTATUS StartTrackCDI( )
263: {
264: NTSTATUS Status=STATUS_SUCCESS;
265:    Status=HookInt2EService( &hUserMessageCall, HookUserMessageCall,
266:       FindInt2EServiceByID(USER_MESSACE_CALL_SERVICE));
267: if (Status==STATUS_SUCCESS)
268: UserMessageCallHandler=hUserMessageCall.pOldFunction;
269:    Status=HookInt2EService( &hUserPostMessage, HookUserPostMessage,
270: FindInt2EServiceByID(USER_POST_MESSACE_SERVICE));
271: if (Status==STATUS_SUCCESS)
272: UserPostMessageHandler=hUserPostMessage.pOldFunction;
273:    Status=HookInt2EService( &hUserSendInput, HookUserSendInput,
274: FindInt2EServiceByID(USER_SEND_INPUT_SERVICE));
275: if (Status==STATUS_SUCCESS)
276: UserSendInputHandler=hUserSendInput.pOldFunction;
277: Status=FindInt2EServiceCall(
278:       FindInt2EServiceByID(USER_QUERY_WINDOW_SERVICE),
279: (PVOID*)(&NtUserQueryWindow));
280: Status=FindInt2EServiceCall(
281:       FindInt2EServiceByID(USER_GET_FOREGROUND_WINDOW_SERVICE),
282: (PVOID*)(&NtUserCetForegroundWindow));
283: return Status;
284: }
285: NTSTATUS StopTrackGDI( )
286: {
287: NTSTATUS Status=STATUS_SUCCESS;
288: Status=UnhookInt2EService(&hUserMessageCall);
289: Status=UnhookInt2EService(&hUserPostMessage);
290: Status=UnhookInt2EService(&hUserSendInput);
291: return Status;
292: }
```

At lines 262-284 a "StartTrackGDI( )" function is an initialization routine that is analogous to the "StartTrackLPC( )" function described above. In this case, however, the messages that are being intercepted are GDI (graphics device interface) messages. As shown at line 265, one of the messages being intercepted is a "hUserMessageCall" which is the kernel equivalent of a user-level "SendMessage". A second type of message that is being trapped is a "hUserPostMessage" as illustrated at line 269 which is equivalent to a "PostMessage". A third is a "hUserSendInput" message as shown at line 273 which is a way of pushing keystrokes, mouse movement, and mouse clicks into the data stream that may potentially be used to circumvent a security application. These are only three examples and those skilled in the art will appreciate that there are other messages that could also be misused and may be handled in a similar fashion.

At the end of the "StartTrackGDI( )" initialization routine there are two additional calls to a "FindInt2EServiceCall" routine at lines 277-279 (for finding "NtUserQueryWindow")

and lines 280-282 (for finding "NTUserGetForegroundWindow"). Direct access to these routines is not available in the kernel, so these routines obtain pointers from the dispatch table in a manner similar to that described above with respect to the "StartTrackLPC( )" function. The "StopTrackGDI( )" function at lines 285-292 is analogous to the above-described "StopTrackLPC( )" routine. As shown, the three services that are hooked by the "StartTrackGDI( )" function are unhooked by this "StopTrackGDI( )" function.

The "IsProcessFilter", "AddProcessFilter", and "DelProcessFilter" routines at lines 100-137 illustrate a very simple mechanism of one embodiment for testing if a process is a process that is of interest, registering a process by adding it to a registry, and removing a process from the registry, respectively. As shown at lines 96-97 the registry in this embodiment comprises an array of up to 4 processes, although a different number of processes could of course be included in the array if desired. Processes can be added to an empty location in the array through the "AddProcessFilter" routine or removed from the array "DelProcessFilter" routine. The "IsProcessFilter" routine tests if a process is a process of interest. Information about registered processes can also be obtained by consulting the array.

The "HookUserMessageCall" routine commencing at line 197 looks for a potentially malicious application which might send messages in order to circumvent security measures. At line 202 a "MsgContinue" routine is called. The "MsgContinue routine itself is shown at lines 161-194. For performance reasons, the "MsgContinue" routine checks to determine if the message is a Windows message that is of interest. It is easier and faster to first determine if the message is of interest before examining the message in more detail. For example, as shown at lines 170-172, the "lParam" (or second parameter) of a "WM_TIMER" message is identified as being of interest because a malicious application can potentially insert a pointer as an avenue for attacking a targeted application. At lines 174-190 is a list of Windows messages that may be generated based on a number of different types of user interaction with the system (e.g., keystrokes, button clicks, mouse clicks, and so forth) and that may potentially be used to attack a protected process or application. If a message is one of these types of messages that may potentially cause harm or circumvent security, a "WndContinue" routine is called as shown at line 191 to determine if the window relates to a protected process or application and to track this type of potentially harmful message.

The "WndContinue" routine at lines 138-160 determines if the window is owned by a registered process that is being tracked (i.e., protected). As shown at line 140, a check is first made to ensure that an "NtUserQueryWindow" function is available as it is necessary for execution of this "WndContinue" routine. The "NtUserQueryWindow" function is a function available in the operating system kernel that provides certain characteristics about a window ("hWnd"). Next, the code at lines 143-146 is a performance optimization. As shown, the last window is cached given that a number of messages are typically received relating to the same window. Caching the last window may avoid the need to look up information about the window with a call to the "NtUserQueryWindow" function each time. In the currently preferred embodiment a single window is cached; however, multiple windows could be cached if desired.

If information is not available in cache, then an "NtUserQueryWindow" function is called to obtain information on the window as show at lines 147-152. In this case the information that is of interest is the Windows process ("dwProcessID"). As shown at line 153, after the process identifier ("dwProcessID") has been obtained, the above-described "IsProcessFilter" routine is called to determine if this particular process is of interest (e.g., a registered process). If the process is of interest, then at line 154 the process identifier is also compared with "GetCurrentProcessID( )" to verify that the calling process and the process being called are not the same. In other words, if the calling process is calling itself, then this call is not of interest for purposes of controlling interprocess communications.

In the currently preferred embodiment, a determination is made as to whether the process that is being called is a protected process or application (i.e., one that has been registered). If the process that is being called is a protected process then "FALSE" is returned as shown at line 156. Otherwise, "TRUE" is returned as shown at line 159 to indicate that the communication should be allowed to proceed. However, those skilled in the art will appreciate that other filters may also be used, if desired. For example, a test could be made to determine if a process was a "trusted" process. If the process was a trusted process it may be allowed to proceed (i.e., communicate). As another example, the individual parameters of a call that may potentially be malicious can be changed or manipulated (both before and after invocation). For example, one may wish to fill in a data structure with useless data in an effort to thwart a malicious application. In addition, the status that is returned can also be adjusted if desired. For example, the status may be adjusted to let a potentially malicious application think that it succeeded when, in fact, it is blocked.

If the process is not protected (i.e., if "TRUE" is returned), then an actual handler is called as illustrated at lines 202-206 of the "HookUserMessageCall" routine. In this event the message is sent to the original destination. Otherwise, the message is blocked, and a message status is returned as shown at lines 208-216. A debug message is also printed. The same approach is also used in the "HookUserPostMessage" and "HookUserSendInput" routines at lines 220-261 to address different types of messages that may be sent.

It should be noted that there is slight variation with the "HookUserSendInput" routine. The "SendInput" function sends a message comprising a structure of various keystrokes or mouse events to the kernel to insert into the window that has the current focus. In this case, an additional step is required when the message is received, which is to determine the current window that is to receive the message by calling a "NtUserGetForegroundWindow" function as shown at lines 246-248. Otherwise, the same approach is used as described above for the "HookUserMessageCall" routine. If the message is allowed, the original handler is called and the message is sent to the original destination. Otherwise, the message is blocked and a zero ("0") is returned as provided at lines 253-260. In this manner, a registered process or application is protected from messages (e.g., keystroke and/or mouse event messages) that may be sent by malicious applications to an active window in an effort to disable or interfere with the protected application.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a computer system operating under control of an operating system, a method for detecting and preventing indirect access to a computer network by potentially malicious applications already installed and executing on the computer system, the method comprising:
defining rules governing access by applications on the computer system to the computer network including rules indicating which system services of the operating system are monitored for detecting and preventing indirect access to the computer network by potentially malicious applications that are already installed and executing on the computer system, but which are capable of obtaining indirect access to the computer network through system services;
trapping an attempt by a particular application already installed and executing on the computer system to gain indirect access to the computer network through invocation of a particular system service being monitored, wherein said trapping includes rerouting the attempt to invoke the particular system service from a system dispatch table to an interprocess communication controller by replacing an original destination address in the system dispatch table with an address of the interprocess communication controller;
detecting based on the rules governing access by applications to the computer network if the attempt to invoke the particular system service by the particular application rerouted to the interprocess communication controller constitutes an unauthorized attempt by a potentially malicious application already installed and executing on the computer system to obtain indirect access to the computer network by invoking the particular system service which in turn accesses the computer network on behalf of the potentially malicious application; and
if the attempt to invoke the particular system service constitutes an unauthorized attempt by a potentially malicious application to access the computer network indirectly, preventing the potentially malicious application from obtaining indirect access to the computer network by blocking the attempt.

2. The method of claim 1, wherein said trapping step includes intercepting operating system calls for invoking the particular system service.

3. The method of claim 1, wherein said trapping step includes intercepting local procedure calls for invoking the particular system service.

4. The method of claim 1, wherein said trapping step includes intercepting an attempt to open a communication channel to the particular system service.

5. The method of claim 1, further comprising the steps of:
retaining the original destination address; and
using the original destination address for invoking the particular system service if the interprocess communication controller determines not to block the attempt.

6. The method of claim 1, wherein the rules governing access by applications on the computer system to the computer network including rules specifying which system services are monitored are established based on user input.

7. The method of claim 1, wherein the step of blocking the attempt is based upon consulting a rules engine for determining applications authorized to invoke the particular system service to indirectly access the computer network.

8. The method of claim 1, wherein the step of preventing includes obtaining user input as to whether the unauthorized application should now be authorized to invoke the particular system service.

9. The method of claim 8, wherein said step of obtaining user input includes the substeps of:
providing information to the user about which particular application is attempting to invoke the particular system service; and
receiving user input as to whether the particular application should be blocked from invoking the particular system service.

10. A non-transitory computer-readable medium having computer-executable instructions for performing the method of claim 1.

11. The method of claim 1, further comprising:
downloading a set of computer-executable instructions for performing the method of claim 1.

12. In a computer system operating under control of an operating system, a method for detecting and preventing indirect access to the Internet by potentially malicious applications already installed and executing on the computer system, the method comprising:
defining a policy indicating which system services of the operating system are monitored for detecting and preventing indirect access to the Internet by potentially malicious applications that are already installed and executing on the computer system but which are capable of obtaining indirect access to the Internet through system services, said policy specifying processes authorized to access the Internet;
intercepting an attempt by a first process to communicate with a second process in a manner that provides the first process with indirect access to Internet, wherein said intercepting includes rerouting the attempt by the first process to communicate with the second process from a system dispatch table to an interprocess communication controller by replacing an original destination address in the system dispatch table with an address of the interprocess communication controller;
identifying the first process that is attempting to communicate with the second process;
identifying the second process;
based on said policy, determining whether the first process may communicate with the second process in a manner that provides the first process with indirect access to Internet, including determining if the attempt to invoke the particular system service rerouted to the interprocess communication controller does constitute an unauthorized attempt by a potentially malicious application to access the Internet indirectly; and
allowing the first process to communicate with the second process if said policy indicates that the first process may communicate with the second process in a manner that provides the first process with indirect access to Internet and does not constitute an unauthorized attempt by a potentially malicious application to access the Internet indirectly.

13. The method of claim 12, wherein the first process comprises an instance of an application program.

14. The method of claim 12, wherein the second process comprises a system service.

15. The method of claim 12, wherein said intercepting step includes intercepting operating system calls made by the first process to attempt to communicate with the second process.

16. The method of claim 12, wherein said intercepting step includes detecting local procedure calls.

17. The method of claim 12, wherein said intercepting step includes detecting an attempt by the first process to open a communication channel to the second process.

18. The method of claim 12, wherein said step of identifying the second process includes evaluating parameters of the attempt made by the first process to communicate with the second process.

19. The method of claim 12, wherein said policy specifies particular processes to be protected from communications made by other processes.

20. The method of claim 12, further comprising:
providing for a process to be registered in order to be protected from communications made by other processes; and
determining whether to allow the first process to communicate with the second process based, at least in part, upon determining whether the second process is registered.

21. The method of claim 20, wherein said determining step is based, at least in part, on the type of communication the first process is attempting with the second process.

22. In a computer system operating under control of an operating system, a method for detecting and preventing one application already installed and executing on the computer system from gaining indirect Internet access through other applications, the method comprising:
registering a first application to be protected from serving as a proxy by which other applications may gain indirect Internet access for detecting and preventing indirect access to the Internet by potentially malicious applications that are already installed and executing on the computer system but which are capable of obtaining indirect access to the Internet through said first application;
detecting an attempt by a second application already installed and executing on the computer system to access the first application for purposes of using the first application as a proxy for indirect Internet access;
identifying the second application that is attempting to access the first application for purposes of using the first application as a proxy for indirect Internet access; and
rerouting the attempt to access the first application through an interprocess communication controller that determines whether to allow the attempt, based on rules indicating whether the second application is authorized to access the first application using interprocess communication, wherein said rerouting includes replacing an original destination address for the first application in a system dispatch table with an address of the interprocess communication controller.

23. The method of claim 22, wherein said registering step includes supplying rules specifying particular communications from which the first application is to be protected.

24. The method of claim 23, wherein the interprocess communication controller determines whether to allow the attempt based, at least in part, upon the rules specifying particular communications from which the first application is to be protected.

25. The method of claim 22, wherein said detecting step includes intercepting operating system calls for accessing the first application.

26. The method of claim 22, wherein said detecting step includes detecting a graphical device interface (GDI) message sent to the first application.

27. The method of claim 26, wherein said identifying step includes evaluating parameters of the message sent to the first application.

28. The method of claim 22, wherein said detecting step includes detecting an attempt to send keystoke data to a window of the first application.

29. The method of claim 22, wherein said detecting step includes detecting an attempt to send mouse movement data to a window of the first application.

30. The method of claim 22, wherein said rules indicating whether the second application may access the first application includes rules indicating particular types of communications which are allowed.

31. The method of claim 22, further comprising:
if the interprocess communication controller allows the attempt to access the first application, routing the attempt to the first application.

32. A system for detecting and preventing indirect access to the Internet access by controlling interprocess communication between applications, the system comprising:
a computer having at least one processor, said computer operating under control of an operating system providing interprocess communication;
a policy specifying applications that are permitted to communicate with a first application using interprocess communication, said first application capable of providing indirect Internet access to other applications, so as to detect and prevent indirect access to the Internet by potentially malicious applications that are already installed and executing on the computer system but which are capable of obtaining indirect access to the Internet through said first application;
a module for detecting an attempt by a second application already installed and executing on the computer system to gain indirect Internet access through the first application using interprocess communication and reroutes the attempt from a dispatch table to an interprocess communication controller by replacing an address of the first application in the dispatch table with an address of the interprocess communication controller; and
an interprocess communication controller for identifying the second application attempting to gain indirect Internet access through the first application using interprocess communication and determining whether to permit the communication based upon the identification of the second application and the policy specifying applications permitted to communicate with the first application.

33. The system of claim 32, wherein said policy includes rules indicating particular types of communications which are permitted.

34. The system of claim 32, further comprising:
a rules engine for specifying applications that are permitted to communicate with the first application using interprocess communication.

35. The system of claim 32, further comprising:
a registration module for establishing said policy.

36. The system of claim 35, wherein said registration module provides for identifying applications to be governed by said policy.

37. The system of claim 32, wherein said module for detecting a second application detects an operating system call to open a communication channel to the first application.

38. The system of claim 32, wherein said module for detecting a second application detects a graphical device interface (GDI) message sent to the first application.

39. The system of claim 32, wherein said module for detecting a second application detects a local procedure call attempting to access the first application.

40. The system of claim 32, wherein said interprocess communication controller determines whether to permit the communication based, at least in part, upon evaluating parameters of the attempt made by the second application to communicate with the first application.

41. The system of claim 32, wherein said interprocess communication controller determines whether to permit the communication based upon obtaining user input as to whether to permit the second application to communicate with the first application.

* * * * *